United States Patent
Sullivan et al.

(10) Patent No.: US 11,741,945 B1
(45) Date of Patent: Aug. 29, 2023

(54) ADAPTIVE VIRTUAL ASSISTANT ATTRIBUTES

(71) Applicant: Amazon Technologies, Inc., Seattle, WA (US)

(72) Inventors: Joseph Daniel Sullivan, Seattle, WA (US); Pasquale DeMaio, Bellevue, WA (US); Akshay Isaac Lazarus, Seattle, WA (US); Juliana Saussy, Guilford, CT (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 16/587,984

(22) Filed: Sep. 30, 2019

(51) Int. Cl.
G10L 15/07 (2013.01)
G10L 13/033 (2013.01)
G06N 20/00 (2019.01)
G10L 13/00 (2006.01)

(52) U.S. Cl.
CPC .............. *G10L 15/07* (2013.01); *G06N 20/00* (2019.01); *G10L 13/00* (2013.01); *G10L 13/033* (2013.01)

(58) Field of Classification Search
CPC ........ G10L 13/033; G10L 15/07; G10L 13/00; G06N 20/00
See application file for complete search history.

(56) References Cited

U.S. PATENT DOCUMENTS

| | | | | |
|---|---|---|---|---|
| 9,824,695 B2* | 11/2017 | Lyle et al. | ........... | G10L 21/003 |
| 9,870,771 B2* | 1/2018 | Zhou | ................. | H04R 3/00 |
| 10,468,014 B1* | 11/2019 | Edwards et al. | ....... | G10L 15/07 |
| 2013/0275138 A1* | 10/2013 | Gruber et al. | ......... | G10L 13/00 704/260 |
| 2015/0379985 A1* | 12/2015 | Wang et al. | ........... | G10L 15/07 704/250 |
| 2018/0268347 A1* | 9/2018 | Benedetti et al. | ....... | G06Q 30/02 |
| 2018/0314689 A1* | 11/2018 | Wang et al. | ........... | G10L 15/07 |
| 2019/0171284 A1* | 6/2019 | Contractor et al. | ...... | G09B 7/00 |
| 2019/0180636 A1* | 6/2019 | Lei et al. | ................ | G16H 50/30 |
| 2019/0287519 A1* | 9/2019 | Ediz et al. | ............. | G06F 40/30 |
| 2020/0193972 A1* | 6/2020 | Feinauer et al. | ....... | G06N 20/10 |
| 2020/0193978 A1* | 6/2020 | Kline et al. | ............ | G06F 3/167 |
| 2020/0243068 A1* | 7/2020 | Morris et al. | .......... | G10L 15/26 |
| 2020/0356237 A1* | 11/2020 | Moran et al. | ............ | G06N 5/02 |
| 2021/0089860 A1* | 3/2021 | Heere et al. | ........... | G06N 3/004 |

\* cited by examiner

*Primary Examiner* — Bhavesh M Mehta
*Assistant Examiner* — Edward Tracy Jr.
(74) *Attorney, Agent, or Firm* — Lee & Hayes, P.C.

(57) ABSTRACT

An adaptive virtual assistant system can be configured to change an attribute of a virtual assistant based on user responses, environmental conditions, and/or topics of discussion. For example, the virtual assistant system can determine, based at least in part on user data, a communication profile that is associated with the virtual assistant and determine first communication data comprising a first communication attribute based on the communication profile. In some instances, the system can transmit the first communication data to a user device and receive, from the user device, input audio data representing a user utterance. Based at least in part on the input audio data, the system can determine second communication data comprising a second communication attribute and transmit the second communication data to the user device.

20 Claims, 9 Drawing Sheets

ADAPTIVE VIRTUAL ASSISTANT ATTRIBUTES

BACKGROUND

A user may contact or use a service that uses a virtual assistant or a virtual customer service representative. As the user communicates with the virtual assistant, the user and/or the virtual assistant may have difficulty understanding one another. This can result in a suboptimal user experience. Additionally, effectively communicating with a user using a virtual assistant can present technical challenges. For example, a user may be in a noisy environment creating background noise, have a poor communication connection, and/or speak a different language than that of the virtual assistant. This can result in additional computational and human resources dedicated toward understanding and interacting with the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
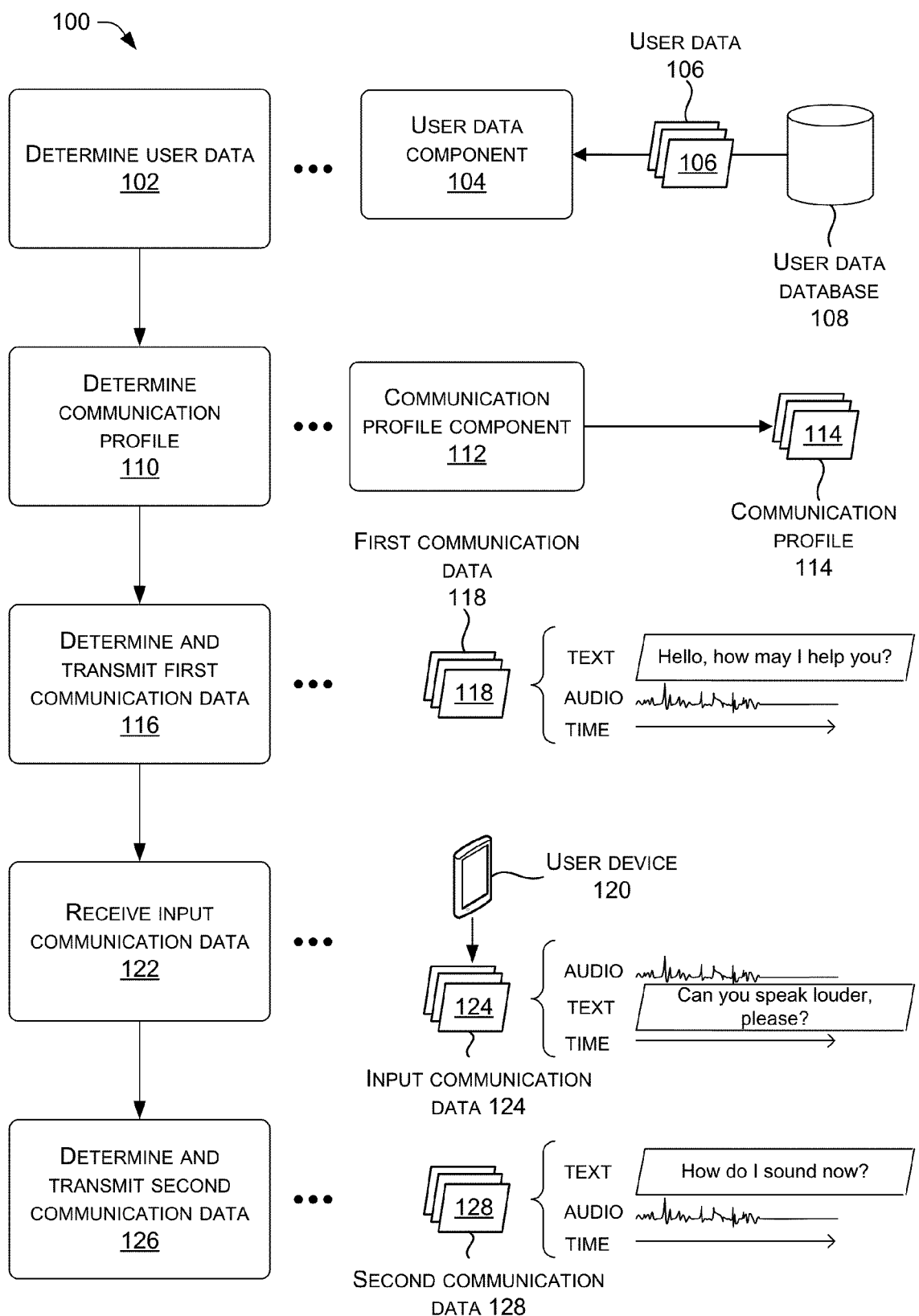
FIG. 1 is a pictorial flow diagram of a system for determining and transmitting communication data based on at least in part on receiving input communication data from a user device.

The systems and processes described herein are directed to a virtual assistant system for interacting with users. By way of example and without limitation, the virtual assistant system can be used as a virtual customer service representative when a user calls in for customer service or as a personal virtual assistant to respond to queries and/or commands of the user on a device (e.g., a cell phone, a smart speaker, a voice-controlled device, etc.). The virtual assistant system can determine a communication profile of a virtual assistant based on user data that indicates a preference of the user. For example, the user data can indicate that a user prefers a virtual assistant that speaks quickly. The communication profile can store and/or be associated with one or more communication attributes that correspond to the user preference (e.g., speaking quickly, etc.) where the communication profile can define a personality/personalities and/or a trait/traits of the virtual assistant.

Using the communication profile, the virtual assistant system can determine communication data to initiate a communication, such as a communication session, with the user. For example, the communication data can include text data and attribute data that is associated with the text data. The virtual assistant system can encode the communication data using a text-to-speech protocol. For example, a markup format (e.g., Speech Synthesis Markup Language [SSML], extensible Markup Language [XML], and the like) can be used such that when processed, a device processing the encoded data can produce an audio signal that represents the communication text in a manner associated with the attribute data (e.g., speaking quickly).

The virtual assistant system can receive a response from the user in the form of input communication data that represents an utterance of the user (e.g., a voice command, an audible question, etc.). The virtual assistant system can use a speech-processing system to perform operations such as speech recognition (e.g., automatic speech recognition (ASR)) and/or natural language processing (e.g., natural language understanding (NLU)) to determine content data that represents the utterance of the user and context data that can represent portions of the input communication data that is associated with the content data (e.g., background noise). Based at least in part on the content data and/or the context data, the virtual assistant system can determine an estimated comprehension metric associated with the user. The estimated comprehension metric can be represented as a numerical value that is generated by the virtual assistant system to represent an estimated level of comprehension associated with the user of the communication between the virtual assistant system and the user. If the virtual assistant system detects that the user is having difficulty hearing the audio of the virtual assistant system and/or having difficulty understanding the text and/or speech of the virtual assistant system, the virtual assistant system can generate an estimated comprehension metric with a lower numerical value. If the user responds to questions and/or comments from the virtual assistant system appropriately, the virtual assistant system can generate an estimated comprehension metric with a higher numerical value. By way of example and without limitation, the content data can indicate that the user requested the virtual assistant to speak louder, which can cause the estimated comprehension metric to be decreased. By way of another example and without limitation, the virtual assistant system can, based at least in part on the context data, determine that the signal-to-noise ratio is low, which can also cause the estimated comprehension metric to be decreased.

The virtual assistant system can use the estimated comprehension metric to determine a response to the user input (e.g., the input communication data). For example, if the estimated comprehension metric meets or exceeds a comprehension metric threshold value, then the virtual assistant system can continue to communicate with the user using the communication profile and/or the attribute data used with the communication data during the initial communication with the user.

If the estimated comprehension metric does not meet or exceed the comprehension metric threshold value, the virtual assistant system can use the content data and/or the context data associated with the input communication data to determine a different attribute data to increase a likelihood that the estimated comprehension metric will increase. Different attribute data can change the attributes of the virtual assistant such as, for example, a volume of virtual assistant's voice, a speed of the virtual assistant's speech, and the like. Then communication data using the updated communication attribute(s) can be encoded and transmitted to the user device.

The ability to detect an estimated comprehension metric of a user and responding in a manner to increase the estimated comprehension metric presents technical challenges. One challenge, for example and as discussed above, involves accurately interpreting an utterance of the user represented in audio data and/or context data associated with the audio data. As discussed above, the virtual assistant system can be configured to determine a signal-to-noise ratio associated with the audio data to determine communication attributes to increase the estimated comprehension metric. By way of example and without limitation, the virtual assistant system can determine that the signal-to-noise ratio does not meet or exceed a signal-to-noise ratio threshold value and determine a volume attribute with a value that increases a level (or an amplitude) of the audio when the encoded communication data is decoded into output audio data for the user.

By way of another example and without limitation, the virtual assistant system can, based on the content data that represents the utterance of the user, determine that the user repeated the word "what" in the audio data. Then, the virtual assistant system can determine a speed attribute with a value that decreases a level of the speed of the audio when the encoded communication data is decoded into output audio data for the user. Therefore, accurately interpreting the utterance of the user poses technical challenges in determining an estimated comprehension metric of a user.

To address these technological problems, the system described herein can use ASR and NLU processing techniques to determine the content data and/or context data associated with the input communication data that represents the utterance of the user and, based at least in part on the content data and/or the context data, determine the estimated comprehension metric. Additionally, the techniques discussed herein can improve a functioning of a computing device by decreasing the amount of computing resources consumed from incorrectly determining the estimated comprehension of a user or not responding appropriately to a request of the user. By accurately determining the estimated comprehension metric associated with the user, the virtual assistant system can reduce the amount of computing resources (e.g., data processing resources etc.) used to respond to a user. Additionally, improving the comprehension of a user and the user understanding the virtual assistant can result in less data being transmitted across a network. A user may, less frequently, request the virtual assistant to repeat a question and/or statement and the virtual assistant may reduce the number of times it repeats substantially similar content. This can result in less data being transmitted across a network, increase available network bandwidth, decrease a latency, across the network, etc. Therefore, the functioning of a computing device can be increased by reducing the computational and network resources consumed by determining the estimated comprehension metric and determining communication data that is responsive to the estimated comprehension metric.

FIG. 1 is a pictorial flow diagram of an example process 100 for determining and transmitting communication data based at least in part on receiving input communication data from a user device. At operation 102, a user data component 104 can receive user data 106 associated with a user from a user data database 108. In some instances, the user can initiate a communication with the virtual assistant system and the user data component 104 can obtain the user data 106 that is associated with the user from the user data database 108. The user data component 104 can use a user identifier (e.g., a telephone number associated with the user, an e-mail address associated with the user, a username, a unique identifier, and the like) to identify the user data 106 that is associated with the user.

The user data 106 can include data provided by the user. For example, the user can subscribe to a service and provide information (e.g., demographic information, and the like) to the service that can be stored in the user data database 108. In some instances, the user can respond to a survey and/or provide information to complete a user profile (e.g., user preferences, user interests, and the like). In some instances, the user data 106 can include activity data of the user. For example, the user data 106 can include shopping history data that includes purchases made by the user, viewed items, selected items, etc. The activity data (e.g., historical log data) can also include browsing data that includes a log of Internet browsing activity associated with the user and location data that includes a log of location activity associated with the user. This data can be captured by a service used by the service and stored in the user data database 108. It will be appreciated that collection of data associated with a user would be subject to the user's authorization for collecting such data.

In some instances, the virtual assistant system can initiate the communication between the virtual assistant system and the user. By way of example and without limitation, the user can be associated with a service (e.g., a banking service, an insurance service, a retail service, and the like) that uses the virtual assistant system. The service may need to contact the user to notify the user of an update with their service (e.g., a banking withdrawal notice, an updated contact information request, an order confirmation, etc.). The virtual assistant system can receive a user identifier that is associated with the user and obtain the user data 106 from the user data database 108 using the user identifier. Then the virtual assistant system can call the user to initiate the communication between the virtual assistant system and the user.

At operation 110, a communication profile component 112 can determine a communication profile 114 based at least in part on the user data 106. For example, the user data 106 can indicate preferences associated with the user (e.g., a preference for fast speaking customer service representatives, a preference for customer service representatives with a louder voice, and the like). The communication profile component 112 can determine, based at least in part on the user data, one or more communication attributes that are stored and/or associated with the communication profile 114. The one or more communication attributes can indicate, for example, a speech speed, a speech pitch, a speech inflection, and the like.

At operation 116, the process 100 can proceed by determining, based at least in part on the communication profile 114, first communication data 118. As discussed above, the communication profile 114 can store and/or be associated with one or more communication attributes. The first communication data 118 can include first communication text data (e.g., depicted in FIG. 1 as "Hello, how may I help you?") and first communication attribute data that is associated with the one or more communication attributes. By way of example and without limitation, the first communication attribute can indicate a volume level that controls an audio output by the user device 120. In some instances, the first communication data 118 can be encoded using, for example, a markup format (e.g., SSML, XML, and the like) into first encoded data. Then, the first encoded data can be used to generate output audio data.

At operation, 116, the process 100 can further transmit the first communication data 118 (or the first encoded data) to a user device 120 associated with the user. As discussed above, in some instances, the user or the virtual assistant system can initiate the communication between the virtual assistant system. In some instances, if the user initiates the communication, the first communication data 118 can include first communication text data that inquires the user regarding a purpose of the communication. In some instances, if the virtual assistant system initiates the communication, the first communication data 118 can include first communication text data that describes the purpose of the communication. For example, a service that is used by the user can have a change to a feature of the service and the purpose of the communication can be to inform the user of the change. By way of example and without limitation, a bank used by the user can change an interest rate and the bank can contact the user where the purpose of the communication is to inform the user of the change in the interest rate.

At operation 122, the virtual assistant system can receive input communication data 124 from the user device 120. The input communication data 124 can be in the form of audio data and the virtual assistant system can use ASR and/or NLU systems to determine content data and context data or the audio data can be preprocessed by ASR and/or NLU systems and provide the input communication data 124 in the form of content data and context data. In some instances, the input communication data 124 can indicate that the user had or will likely have difficulty comprehending the first communication data 118.

By way of example and without limitation, the content data associated with the input communication data 124 can represent the user stating "Can you speak louder, please?" as depicted in FIG. 1. This can indicate that the user may have had difficult comprehending the virtual assistant system. By way of another example and without limitation, the context data associated with the input communication data 124 can indicate that the input communication data 124 has an amount of background noise and determine that the signal-to-noise ratio less than a signal-to-noise ratio threshold value. Based at least in part on the signal-to-noise ratio meeting or exceeding the signal-to-noise ratio threshold value, the virtual assistant system can determine that the user likely had or will have difficulty comprehending the first communication data 118.

In some instances, the virtual assistant system can determine an estimated comprehension metric associated with the user. The estimated comprehension metric can be represented as a numerical value that is generated by the virtual assistant system to represent an estimated level of comprehension associated with the user of the communication between the virtual assistant system and the user. If the virtual assistant system detects that the user is having difficulty hearing the audio of the virtual assistant system and/or having difficulty understanding the text and/or speech of the virtual assistant system, the virtual assistant system can generate an estimated comprehension metric with a lower numerical value. If the user responds to questions and/or comments from the virtual assistant system appropriately, the virtual assistant system can generate an estimated comprehension metric with a higher numerical value. By way of example and without limitation, the estimated comprehension metric can be a numerical scale (e.g., 0 indicating that the user will likely not comprehend any communication from the virtual assistant system, up to 1 indicating that the user will likely comprehend all communication from the virtual assistant system). In other embodiments, the estimated comprehension metric, and any other metric described herein, may include any set of characters (e.g., letters, numbers, etc.), symbols (e.g., thumbs up, thumbs down, etc.), images, and so on. The virtual assistant system can determine an estimated comprehension metric based on the input communication data 124.

As discussed above, the signal-to-noise ratio can be less than the signal-to-noise ratio threshold value and the amount by which the signal-to-noise ratio is less than the signal-to-noise ratio threshold value can be used to determine the estimated comprehension metric. The signal-to-noise ratio can be determined by comparing a level of a desired signal (e.g., the voice of the user) to the level of background noise. For example, audio data of a user speaking in a quiet room can have a high signal-to-noise ratio while audio data of a user speaking near an active construction area with heavy equipment noises can have a low signal-to-noise ratio. In some instances, the signal-to-noise ratio can be expressed in decibels. The virtual assistant system can determine that input communication data 124 with a low signal-to-noise ratio can indicate that the user may have difficulty hearing audio generated by the communication data generated by the virtual assistant system due to the background noise.

By way of example and without limitation, the signal-to-noise ratio can be less than the signal-to-noise ratio threshold value by 15% which can be associated with a 0.2 decease in the estimated comprehension metric. By way of another example and without limitation, the content data of the input communication data 124 can indicate that the user said "What?" which can decrease the estimated comprehension metric by 0.8. In some instances, the estimated comprehension metric can be compared to an estimated comprehension metric threshold value such as 0.75, although any other suitable threshold value is contemplated (e.g., 0.8, 0.9, etc.).

At operation 126, the virtual assistant system can determine second communication data 128. As discussed above, the virtual assistant system can determine an estimated comprehension metric. If the estimated comprehension metric meets or exceeds the estimated comprehension metric threshold value, the virtual assistant system can determine that the user likely understood the virtual assistant, and vice versa, and can continue to use the one or more communication attributes associated with the first communication data 118 to determine the second communication data 128. If the estimated comprehension metric does not meet or exceed the estimated comprehension metric threshold value, thereby indicating that the user and/or the virtual assistance likely did not understand one another, the virtual assistant system can determine a different communication attribute to determine the second communication data 128. By way of example and without limitation, the input communication data 124 can indicate that the signal-to-noise ratio does not meet or exceed the signal-to-noise ratio threshold value and that the amount by which it is less than the signal-to-noise ratio threshold value can cause the estimated comprehension metric to not meet or exceed the estimated comprehension metric threshold value. The virtual assistant system can determine a second communication attribute that increases the volume attribute associated with the second communication data 128 such that when the second communication data 128 is processed, audio will be output at a higher volume when compared to the first communication data 118.

In some instances, the second communication data 128 can be encoded using, for example, a markup format, into second encoded data. At operation 126, the process 100 can further transmit the second communication data 128 or the second encoded data to a user device 120 associated with the user as, in some instances, a response to the input communication data 124.

By way of example and without limitation, a user can call a customer support phone number of a service using a cell phone. The service can detect the phone number used by the user and provide the phone number to the virtual assistant system. The virtual assistant system can use the phone number as a user identifier to retrieve user data 106 from the user data database 108. The user data 106 can indicate that the user prefers virtual assistants that speak quickly. Using the user data 106, the virtual assistant system can determine a communication profile 114 that includes a speech speed attribute that can control a speed of the audio output by a user device 120.

Based on the communication profile 114, the virtual assistant can generate first communication data 118 that includes a greeting and the speech speed attribute associated with the greeting. The virtual assistant can transmit the first communication data 118 to the user device 120 which can output the audio at a speed indicated by the speech speed attribute. Then the virtual assistant system can receive input communication data 124 that represents an utterance of the user.

The virtual assistant system can determine that the user had difficulty hearing the audio generated, based on the first communication data 118, by the user device 120. In response, the virtual assistant system can determine second communication data 128 that includes the speech speed attribute as well as a volume attribute that controls an audio level output by the user device 120. Then the virtual assistant system can transmit the second communication data 128 to the user device 120.

Figure 2:
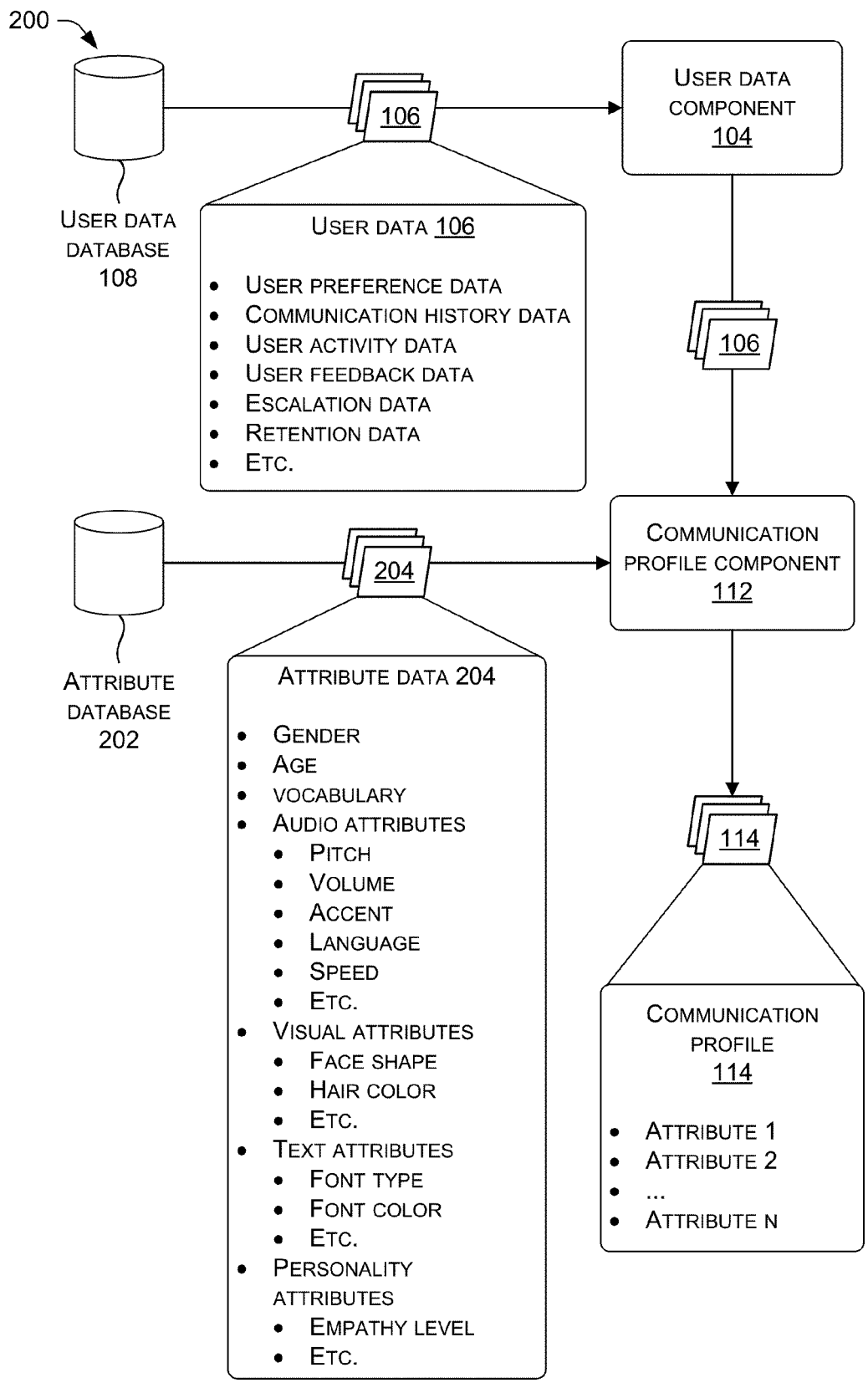
FIG. 2 is a pictorial diagram of receiving user data and determining a communication profile based at least in part on attribute data and the user data.

FIG. 2 is a pictorial diagram 200 of receiving user data and determining a communication profile based at least in part on attribute data and the user data. As discussed above, the user data component 104 can receive the user data 106 from a user data database 108. In some instances, the user data 106 can include data such as, but not limited to, user preference data, communication history data, user activity data, user feedback data, escalation data, retention data, etc.

The user preference data can include data that a user has explicitly provided that indicates a preference of the user. By way of example and without limitation, the user preference data can indicate that the user prefers communications using a phone (e.g., phone calls), text messaging (e.g., SMS or other text messaging protocols), or video conferencing. In some instances, the user preference data can indicate that the user prefers communicating via a type of device (e.g., a cell phone, a tablet computer, a laptop, a voice-controlled device, a smart speaker, a smart television, a smart refrigerator, a smart microwave, and the like). In some instances, the user preference data can indicate that the user prefers to communicate during a time of day and/or a day of the week.

The communication history data can represent a log of past communications between the user and the virtual assistant system and can include a transcript or audio files of the communications. By way of example and without limitation, if the user communicated with the virtual assistant using a text messaging platform/protocol, the communication history data can include the text-based communication. If the user communicated with the virtual assistant using a phone and exchanging audio signals, the communication history data can transcribe the audio data, using, for example, ASR and/or NLU systems, and include a transcript of the audio-based communication. In some instances, the communication history data can include the audio data of the audio-based communication, which may be stored in one or more audio files. Similarly, if the user communicated with the virtual assistant using a video conferencing platform/protocol, the communication history data can include a transcript of the video-based communication and, in some instances, include the video data of the video-based communication, which can be stored in one or more video files. In some instances, the user may opt in and/or approve of such collection of data and/or the communication history data can expire and be discarded after an expiration period has passed. In some instances, the user can specify the expiration period.

The user activity data can include data indicating actions taken by the user. For example, the user activity data can include purchase data indicating items and/or services purchased by the user. In some instances, the user activity data can include browsing data indicating Internet browsing activity associated with the user and location data that includes a log of location activity associated with the user. In some instances, the user activity data can be associated with a communication and/or interaction with the virtual assistant system. By way of example and without limitation, the user activity data can indicate that prior to, during, and/or after the communication and/or interaction with the virtual assistant system, the user purchased an item and/or service. It will be appreciated that collection of data associated with a user would be subject to the user's authorization for collecting such data.

The user feedback data can include feedback provided by the user regarding communications between the user and the virtual assistant system. For example, following a communication between the user and the virtual assistant system, the user can be prompted to provide feedback regarding the quality of the communication. By way of example and without limitation, the user can provide feedback indicating a level of satisfaction regarding features of a text-based communication (e.g., grammar, spelling, speed, font type, font style, legibility, ease of comprehension, naturalness, etc.). Additionally, the user can provide feedback indicating a level of satisfaction regarding features of an audio-based communication (e.g., audio quality, volume, speed, enunciation, pitch, naturalness, etc.). Furthermore, the user can provide feedback indicating a level of satisfaction regarding features of a video-based communication (e.g., resolution, responsiveness, realism, naturalness, etc.). As can be understood, the feedback associated with a type of communication (e.g., text, audio, video) can apply to multiple types of communication.

The escalation data can indicate whether the user and/or the virtual assistant system escalated the communication to a human assistant. For example, the user can request to speak with a human assistant. In some instances, this can indicate that the user is not satisfied with the service provided by the virtual assistant system. In some instances, the virtual assistant system can escalate the communication to a human assistant if the virtual assistant system has difficulty understanding the user and/or if the virtual assistant system repeatedly recognizes that the user is having difficulty understanding the virtual assistant system.

In some instances, the user data 106 can include retention data. By way of example and without limitation, the user can contact a service with the intent of canceling a subscription. The retention data can indicate whether a virtual assistant system was successful is dissuading the user from canceling the subscription. As discussed above, the user data 106 is not limited to the examples described herein and can include other data such as purchase data associated with the user, location data associated with the user, etc. It will be appreciated that collection of data associated with a user would be subject to the user's authorization for collecting such data.

As discussed above, the communication profile component 112 can determine a communication profile 114 based at least in part on the user data 106. For example, the user data 106 can indicate preferences associated with the user (e.g., a preference for fast speaking customer service representatives, a preference for customer service representatives with a louder voice, and the like). In some instances, the communication profile component 112 can access an attribute database 202 that stores a plurality of attributes. The communication profile component 112 can determine the attribute data 204 based at least in part on the user data 106 (e.g., the user preferences). For example, the gender and the age of the attribute data 204 can indicate a gender and an age, respectively, of the virtual assistant. The vocabulary and/or diction of the attribute data 204 can indicate a complexity of vocabulary that is used by the virtual assistant system. In some instances, the attribute data 204 can include a dialect that can be associated with a region. For example, a dialect associated with a northwestern portion of the United States can include words and/or phrases that are different from a dialect associated with a northeastern portion of the United States.

In some instances, the communication profile component 112 can determine a communication profile 114 based at least in part on a preferred action associated with the user and/or a preferred outcome. By way of example and without limitation, the communication profile component 112 can determine that a preferred action associated with the user indicating a purchase of a service by the user. The communication profile component 112 can determine a communication profile 114 that can increase an estimated likelihood that the user will purchase the service. By way of another example and without limitation, the communication profile component 112 can determine a preferred outcome associated with the user indicating that the user will refrain from canceling a purchase. The communication profile component 112 can determine a communication profile 114 that can increase an estimated likelihood that the user will refrain from canceling the purchase.

The audio attributes of the attribute data 204 can indicate features associated with a voice of the virtual assistant. For example, the pitch can indicate a pitch or frequency of the voice of the virtual assistant. Additionally, the audio attributes can indicate a volume, accent, language, speed, etc. of the voice of the virtual assistant. Similarly, the visual attributes of the attribute data 204 can indicate a face shape, a hair color, etc. of the virtual assistant system. As can be understood, the listed attributes are not exhaustive of the types of attributes and are provided as examples. Then, based at least partly on the user data 106 and the attribute data 204, the communication profile component 112 can determine the communication profile 114, which can include a set of attributes of the attribute data 204.

Figure 3:
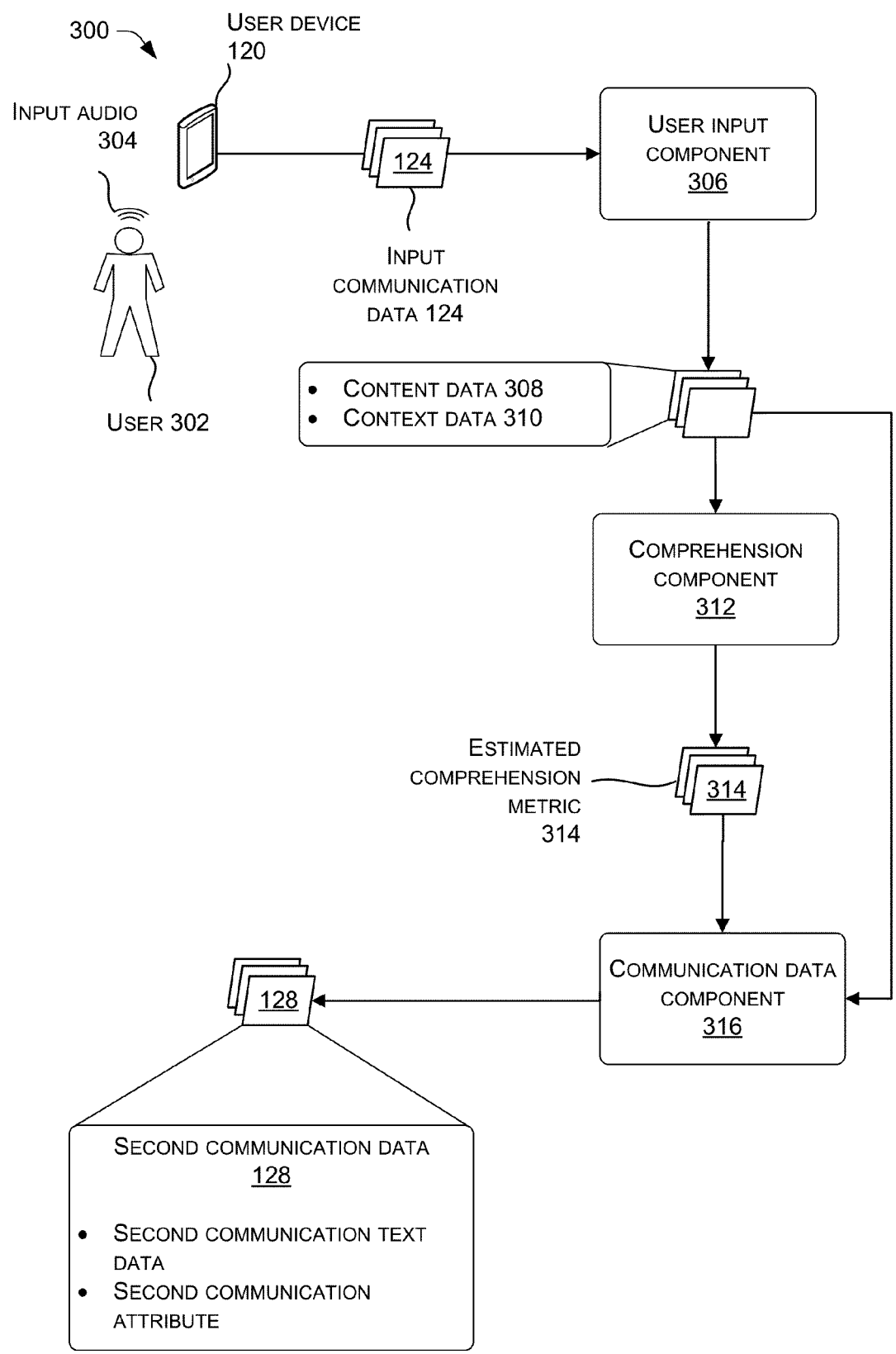
FIG. 3 is a pictorial diagram of receiving input communication data, determining an estimated comprehension metric based at least in part on the input communication data, and determining communication data based at least in part on the estimated comprehension metric.

FIG. 3 is a pictorial diagram 300 of receiving input communication data, determining an estimated comprehension metric based at least in part on the input communication data, and determining communication data based at least in part on the estimated comprehension metric.

As discussed above, a user 302 can provide input audio 304 into a user device 120 associated with the user 302. In some instances, the input audio 304 can be an utterance of the user. The user device can convert the analog input audio 304 into the digital form as input communication data 124 and transmit the input communication data 124 to the user input component 306. As discussed above, in some instances, the user input component 306 can use ASR and/or NLU systems to determine content data 308 and context data 310 based on the input communication data 124. The content data 308 can represent the utterance of the user 302 and the context data 310 can represent portions of the input communication data 124 that are associated with the content data 308.

A comprehension component 312 can receive the content data 308 and the context data 310 to determine the estimated comprehension metric 314. For example, the comprehension component 312 can estimate a level of comprehension by the user 302 and quantify the estimated level of comprehension by generating the estimated comprehension metric 314. As discussed above and by way of example and without limitation, the estimated comprehension metric 314 can be a numerical scale (e.g., 0 indicating that the user will likely not comprehend any communication from the virtual assistant system, up to 1 indicating that the user will likely comprehend all communication from the virtual assistant system). The comprehension component 312 can determine the estimated comprehension metric 314 based on the input communication data 124.

By way of example and without limitation, the content data 308 can indicate that the user 302 requested the virtual assistant to speak louder which can lower the estimated comprehension metric 314. By way of another example and without limitation, the comprehension component 312 can, based at least in part on the context data, determine that the signal-to-noise ratio is low which can lower the estimated comprehension metric 314. The signal-to-noise ratio can be less than a signal-to-noise ratio threshold value and the amount by which the signal-to-noise ratio is less than the signal-to-noise ratio threshold value can be used to determine the estimated comprehension metric 314. By way of example and without limitation, the signal-to-noise ratio can be less than the signal-to-noise ratio threshold value by 15% which can be associated with a 0.2 decease in the estimated comprehension metric 314. By way of another example and without limitation, the content data 308 of the input communication data 124 can indicate that the user said "What?" which can decrease the estimated comprehension metric 314 by 0.8.

A communication data component 316 can use the estimated comprehension metric 314 to determine a response to the user input (e.g., the input communication data 124). For example, if the estimated comprehension metric 314 meets or exceeds a comprehension metric threshold value, then the communication data component 316 can continue to communicate with the user 302 using the communication profile and/or the attribute data used with the communication data during the initial communication with the user 302.

If the estimated comprehension metric 314 does not meet or exceed the estimated comprehension metric threshold value, the communication data component 316 can determine a second communication attribute to determine the second communication data 128. By way of example and without limitation, the input communication data 124 can indicate that the signal-to-noise ratio does not meet or exceed the signal-to-noise ratio threshold value and that the amount by which it is less than the signal-to-noise ratio threshold value can cause the estimated comprehension metric 314 to not meet or exceed the estimated comprehension metric threshold value. The communication data component 316 can determine the second communication attribute that increases the volume attribute associated with the second communication data 128 such that when the second communication data 128 is processed, it can produce a louder audio signal when compared to the first communication data.

Figure 4:
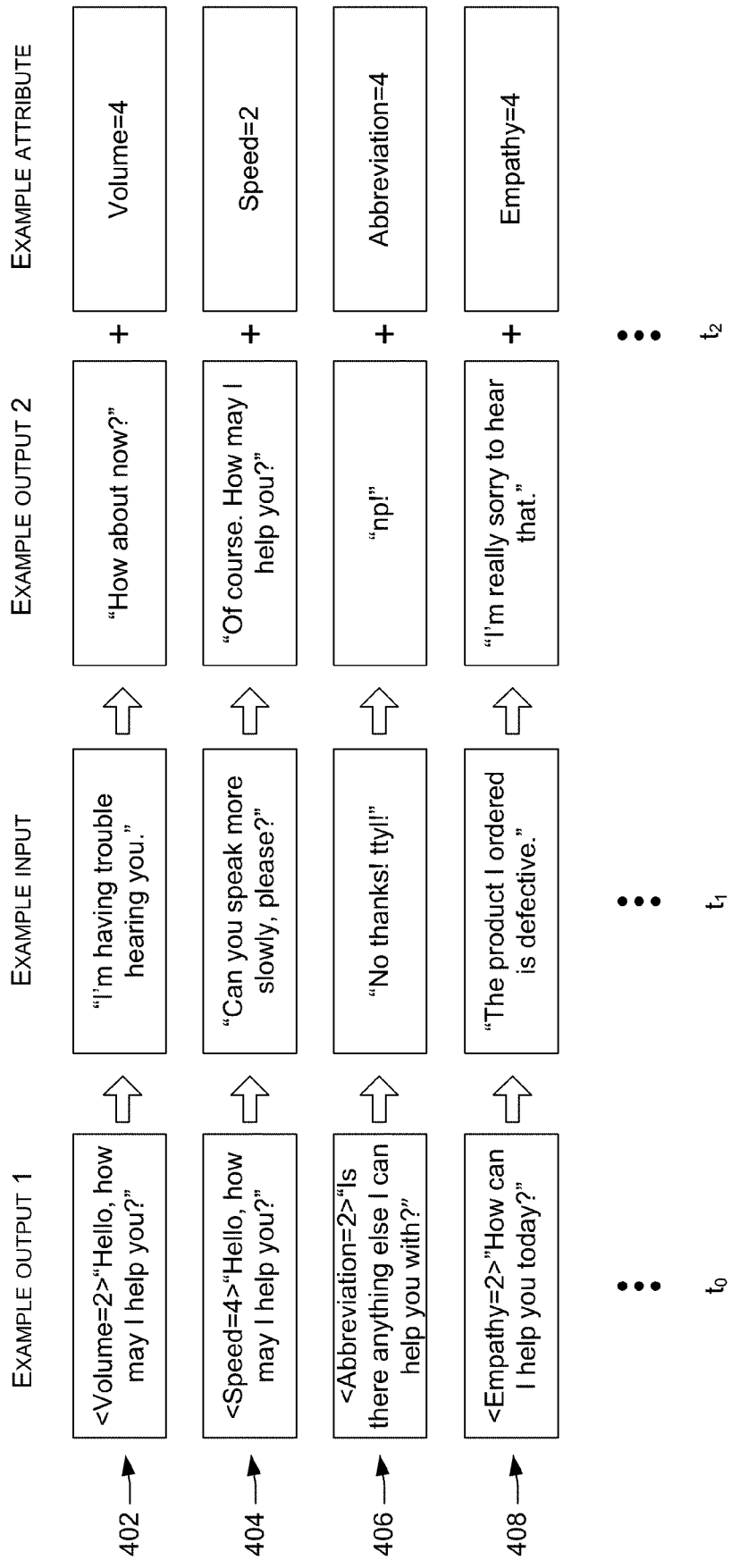
FIG. 4 is a pictorial diagram of example outputs of a computing system with corresponding example attributes in response to example inputs from a user.

FIG. 4 is a pictorial diagram 400 of example outputs of a computing system with corresponding example attributes in response to example inputs from a user. An example 402 can indicate an audio-based communication where a time $t_0$, the virtual assistant system can determine an example output 1 that includes communication text data "Hello, how may I help you?" and a communication attribute setting a volume at a level 2. The volume attribute can be used to control the volume of the audio output by the user device when processing the example output 1. A user can respond at time $t_1$ with example input stating "I'm having trouble hearing you." The virtual assistant system can determine, based on the example input, that an increase in the level of the volume attribute can increase the estimated comprehension metric associated with the user. Then the virtual assistant system can determine an example output 2 at a time $t_2$ that includes communication text data "How about now?" and a communication attribute setting the volume to a level 4.

An example 404 can indicate another audio-based communication where at a time $t_0$, the virtual assistant system can determine an example output 1 that includes communication text data "Hello, how may I help you?" and a communication attribute setting a speed at a level 4. The speed attribute can be used to control the speed of the audio output by the user device when processing the example output 1. A user can respond at time $t_1$ with example input stating "Can you speak more slowly, please?" The virtual assistant system can determine, based on the example input, that a decrease in the level of the speed attribute can increase the estimated comprehension metric associated with the user. Then the virtual assistant system can determine an example output 2 at a time $t_2$ that includes communication text data "Of course. How may I help you?" and a communication attribute setting the speed to a level 2.

An example 406 can indicate a text-based communication where at a time $t_0$, the virtual assistant system can determine an example output 1 that includes communication text data "Is there anything else I can help you with?" and a communication attribute setting an abbreviation at a level 2. The abbreviation attribute can be used to control an amount of abbreviation used for terms or phrases by the virtual assistant system during a communication with the user. A user can respond at time $t_1$ with example input stating "No thanks! ttly!" (e.g., "talk to you later"). The virtual assistant system can determine, based on the example input, that the user is comfortable with a use of abbreviations and that an increase in the level of the abbreviation attribute can increase the estimated comprehension metric associated with the user. Then the virtual assistant system can determine an example output 2 at a time $t_2$ that includes communication text data "np!" (e.g., "no problem") and a communication attribute setting the abbreviation to a level 4.

An example 408 can indicate a text-, an audio-, or a video-based communication where at a time $t_0$, the virtual assistant system can determine an example output 1 that includes communication text data "How can I help you today?" and a communication attribute setting an empathy at a level 2. The empathy attribute can be used to control an amount of empathy expressed by the virtual assistant system during a communication with the user. A user can respond at time $t_1$ with example input stating "The product I ordered is defective." The virtual assistant system can determine, based on the example input, that the user is not satisfied with a retail experience and, as a result, increase the level of the empathy attribute. Then the virtual assistant system can determine an example output 2 at a time $t_2$ that includes communication text data "I'm really sorry to hear that." and a communication attribute setting the empathy to a level 4.

Although examples 402—408 indicate a response (e.g., example output 2) generated by the virtual assistant system based on an example input, the virtual assistant system can generate a response based on multiple inputs from a user. For example, the virtual assistant system can receive multiple inputs (e.g., input data representing multiple statements and/or requests) from the user and generate a response based on the multiple inputs. By way of example and without limitation, the user can provide a first input indicating that the user misunderstood a question from the virtual assistant system and provide a second input that is associated with a low signal-to-noise ratio. Based at least in part on the first and second input, the virtual assistant system can increase a volume of a response provided to the user. At a later time in the communication, a third input and a fourth input can be associated with a high signal-to-noise ratio. Based at least in part on the high signal-to-noise ratio, the virtual assistant system can reduce the volume of response provided to the user. Therefore, the virtual assistant system can continuously adapt during a communication between the user and the virtual assistant system.

Figure 5:
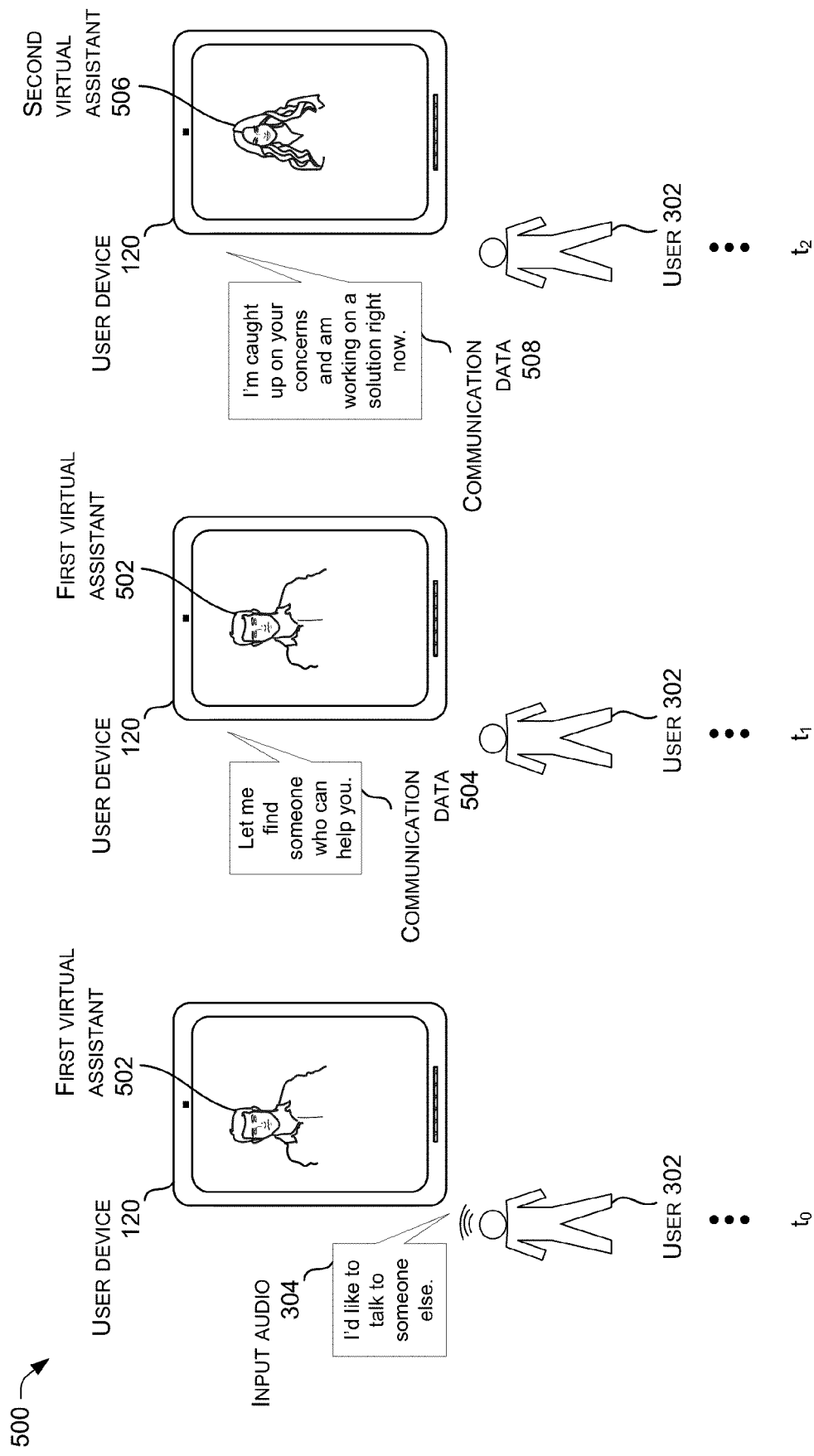
FIG. 5 is a pictorial diagram of an example virtual assistant and changing the virtual assistant in response to a user request.

FIG. 5 is a pictorial diagram 500 of an example virtual assistant and changing the virtual assistant in response to a user request. At a time $t_0$, the user 302 can communicate, using a video-based communication, with a first virtual assistant 502 through the user device 120. The user 302 can provide the input audio 304 which can represent an utterance of the user 302 stating "I'd like to talk to someone else." The virtual assistant system can receive the input audio 304 and determine that the user 302 is not satisfied with the communication with the first virtual assistant 502 and respond at a time $t_1$ with communication data 504 stating "Let me find someone who can help you." In some instances, the virtual assistant system can determine a different communication profile and/or different communication attributes to provide the second virtual assistant 506 at a time $t_2$. In some instances, the virtual assistant system can determine the different communication profile/communication attributes based on the user data associated with the user 302. When the virtual assistant system determines the different communication profile/communication attributes, the virtual assistant system can determine and transmit the communication data 508 to the user device 120.

Figure 6:
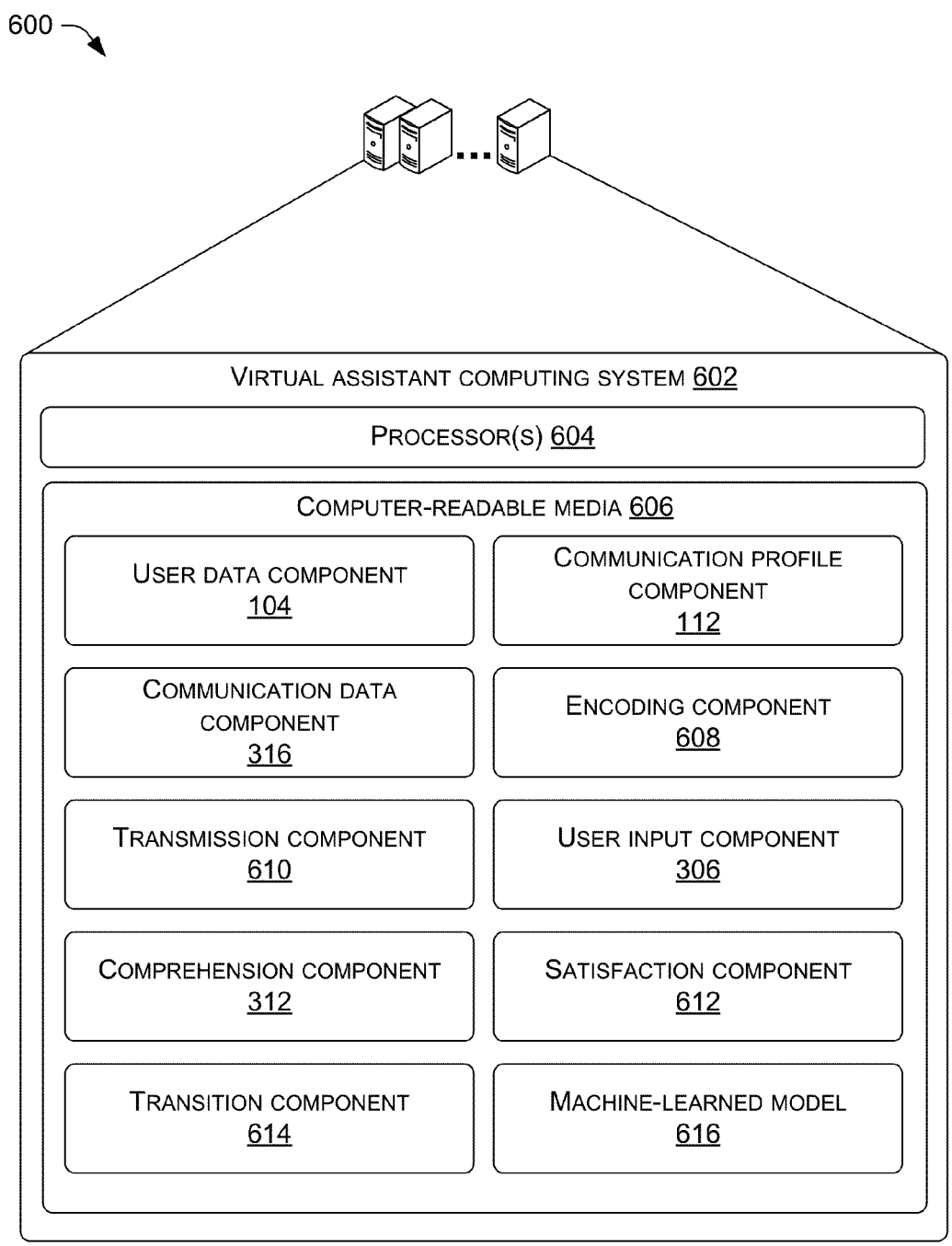
FIG. 6 is a computing system diagram illustrating a configuration for a computing device that can be utilized to implement aspects of the technologies disclosed herein.

FIG. 6 is an illustrative computer architecture 600 of a virtual assistant computing system 602 (also referred to as a virtual assistant system). The virtual assistant system 602 can be implemented in a distributed or non-distributed computing environment. For example, some of the components can be distributed across multiple computing platforms or all of the components can be consolidated onto a single computing platform. Additionally, some of the components can be duplicated and implemented in parallel.

The virtual assistant system 602 can include processor(s) 604 and a computer-readable media 606 that stores various modules, applications, programs, or other data. In some instances, the processor(s) 604 can include a central processing unit (CPU), a graphics processing unit (GPU), both a CPU and a GPU, or other processing units or components known in the art. Additionally, each of the processor(s) 606 can possess its own local memory, which also may store program modules, program data, and/or one or more operating systems. The computer-readable media 606 can also include instructions, that when executed by the processor(s) 604, cause the processor(s) 604 to perform the operations described herein for the delivery confirmation system 602.

The computer-readable media 606 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 606 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 606 can store a user data component 104, a communication profile component 112, a communication data component 316, an encoding component 608, a transmission component 610, a user input component 306, a comprehension component 312, a satisfaction component 612, a transition component 614, and a machine-learned model 616.

The user data component 104 can receive user data associated with a user from a user data database. In some instances, the user can initiate a communication with the virtual assistant system and the user data component 104 can obtain the user data that is associated with the user from the user data database. The user data component 104 can use a user identifier (e.g., a telephone number associated with the user, an e-mail address associated with the user, a username, a unique identifier, and the like) to identify the user data that is associated with the user.

The communication profile component 112 can determine a communication profile based at least in part on the user data received from the user data component 104. For example, the user data can indicate preferences associated with the user (e.g., a preference for fast speaking customer service representatives, a preference for customer service representatives with a louder voice, and the like). In some instances, the communication profile component 112 can access an attribute database that stores a plurality of attributes. The communication profile component 112 can determine the attribute data comprising one or more communication attributes based at least in part on the user data (e.g., the user preferences).

The communication data component 316 can, based on the communication profile determined by the communication profile component 112, determine first communication data to communicate with a user. For example, the first communication data can include first communication text data, that can be a greeting, and first communication attribute data that is associated with the one or more communication attributes.

The encoding component 608 can receive the first communication data from the communication data component 316 and encode the first communication data into first encoded data. For example, the first communication data can be encoded into a human-readable format, such as text data formatted as SSML, XML, and/or other markup language, or in a computer-readable format, such as binary, hexadecimal, etc., which can be processed and converted to text, audio, and/or video data at a user device or at the transmission component 610. For example, the transmission component 610 can transmit to the user device the first encoded data for the user device to process. In some instances, the transmission component 610 can process the encoded data and transmit to the user device unencoded text data, audio data, and/or video data.

The first encoded data can include other formats of text that can be used to create animations, audio data, and other information discussed herein, including metadata that may provide supplemental and/or ancillary information. The first encoded data can include the sentences of the first communication text data, words of the text and/or phonic symbols of the text, which may each include time codes that indicate a time of playback of a respective element of the first communication data (e.g., playback of a particular sound at a certain time, etc.). The first encoded data can include other information, such as emotion values and/or other information to influence or describe sounds and attributes of the first communication data. As discussed herein, the term "phonic symbols" can include phonemes and/or other symbols used to represent distinct sounds which can be associated with respective imagery and/or animation movement, referred to as "visemes". Some phonic symbols may be associated with a same viseme. For example, the sounds for "ch" and "sh" may be represented by different letters, but may be associated with same phonic symbols and visemes.

The user device and/or the transmission component 610 can receive the first encoded data, which can be processed to render text in a text messaging application, output audio from the user device, and/or create animations for virtual assistant on the user device. For example, the user device can output first animation sequences of a mouth of the virtual assistant based at least in part on the phonic symbols and the different time codes associated with each phonic symbol. The user device can output second animation sequences of skeletal components of the virtual assistant based at least in part on the words and the different time codes associated with each word or combinations of words. The skeletal components may include a torso, legs, arms, hands, fingers, and/or other body parts that may move to perform gestures and/or animations. The user device can output animations based on selected words, which may be associated with animation sequences or gestures. The user device can output combined animation sequences of the avatar that include the first animation sequences the second animation sequences based on the first encoded data.

The virtual assistant can be designed to interact with one or more users and/or interact with objects in the real world (e.g., look at a person or object identified at a specific location in the real world via image capture from one or more cameras, etc.), or both. In some examples, the user device can receive input signals that indicate objects and locations (e.g., coordinates) of the objects in the real world. The user device can output an animation sequence to depict the avatar looking at an object or person in the real world based on the input signals.

The user input component 306 can use ASR and/or NLU systems to determine content data and context data based on the input communication data. The content data can represent the utterance of the user and the context data can represent portions of the input communication data that is associated with the content data (e.g., background noise).

The comprehension component 312 can receive the content data and the context data from the user input component 306 to determine an estimated comprehension metric. For example, the comprehension component 312 can estimate a level of comprehension by the user and quantify the estimated level of comprehension by generating the estimated comprehension metric. By way of example and without limitation, the estimated comprehension metric can be a value on a numerical scale (e.g., 0 indicating that the user will likely not comprehend any communication from the virtual assistant system, and 1 indicating that the user will likely comprehend all communication from the virtual assistant system). The comprehension component 312 can determine the estimated comprehension metric based on the input communication data.

The satisfaction component 612 can operate similarly to the comprehension component 312 but determine an estimated satisfaction metric. For example, the satisfaction component 612 can estimate a level of satisfaction of the user and quantify the estimated level of satisfaction by generating the estimated satisfaction metric. By way of example and without limitation, the estimated satisfaction metric can be a numerical scale (e.g., 0 indicating that the user is likely not satisfied with the virtual assistant system, and 1 indicating that the user is likely completely satisfied with the virtual assistant system). The satisfaction component 612 can determine the estimated satisfaction metric based on the input communication data.

For example, as depicted in 408 of FIG. 4, the user can provide an example input stating "The product I ordered is defective." The satisfaction component 612 can determine that a defective product can be associated with a 0.3 decrease in the estimated satisfaction metric. In some instances, the estimated satisfaction metric can be based on a lookup table describing a plurality of circumstances and an estimated satisfaction metric or a decrease in the estimated satisfaction metric. By way of another example and without limitation, the estimated satisfaction metric can receive the content data and the context data and determine that the user speaks with a northeastern American accent. Further, the satisfaction component 612 can determine that the estimated satisfaction metric associated with the user can increase if the virtual assistant matches the accent of the user. Based on the increase of the estimated satisfaction metric, the satisfaction component 612 can indicate to the communication profile component 112 to include the communication attribute that is associated with the northeastern American accent. In some instances, the estimated satisfaction metric can be determined by a machine-learned model as discussed in further detail below.

The communication data component 316 can use the estimated comprehension/satisfaction metric to determine a response to the user input (e.g., the input communication data). For example, if the estimated comprehension/satisfaction metric meets or exceeds a comprehension/satisfaction metric threshold value, then the communication data component 316 can continue to communicate with the user using the communication profile and/or the attribute data used with the communication data during the initial communication with the user.

If the estimated comprehension/satisfaction metric does not meet or exceed the estimated comprehension/satisfaction metric threshold value, the communication data component 316 can determine a second communication attribute to determine the second communication data. By way of example and without limitation, the input communication data can indicate that the signal-to-noise ratio does not meet or exceed the signal-to-noise ratio threshold value and that the amount by which it is less than the signal-to-noise ratio threshold value can cause the estimated comprehension metric to not meet or exceed the estimated comprehension metric threshold value. The communication data component 316 can determine the second communication attribute that increases the volume attribute associated with the second communication data such that the user device 120 can produce, based on the second communication attribute, a louder audio signal when compared to the first communication data.

The transition component 614 can be used to monitor a time period between transmitting the first encoded data and transmitting the second encoded data to prevent a transition from the first communication attribute to the second communication attribute from occurring too rapidly or too slowly. For example, the first encoded data can be transmitted at a first time and the second encoded data can be transmitted at a second time subsequent to the first time. The transition component 614 can determine a transition threshold value based at least in part on the second communication attribute and determine that the time period between the first time and the second time meets or exceeds the transition threshold value or is less than the transition threshold value as appropriate based on the second communication attribute.

By way of example and without limitation, the second encoded data can be based on a second communication profile that is different from the first communication profile associated with the first encoded data. As depicted in FIG. 5, the change from the first virtual assistant 502 to the second virtual assistant 506 can occur quickly (e.g., between $t_1$ and $t_2$) and within the transition threshold value. In some instances, the transition component 614 can indicate to the transmission component 610 to transmit the second encoded data prior to the transition threshold value (e.g., a maximum transition threshold value).

By way of another example and without limitation, the second encoded data can change an accent attribute (e.g., changing from a midwestern American accent to a northeastern American accent). The transition component 614 can determine that a change of an accent attribute should occur gradually and that the time period between the first time and the second time must meet or exceed the transition threshold value to reduce a potential shock or jarring effect on the user (e.g., a minimum transition threshold value). In some instances, the transition component 614 can indicate to the transmission component 610 when the transition threshold value has passed to allow the transmission of the second encoded data associated with the accent attribute change.

The machine-learned model 616 can be trained to output the communication profile based on inputting user data into the machine-learned model. For example, the machine-learned model 616 can be trained using user data from the user data database 108 as training data. The user data can provide user preference data to indicate preferences of a user. Additionally, the user data can include communication history data providing a log of conversation histories as well as other user data discussed with reference to FIG. 3. It will be appreciated that collection of data associated with a user would be subject to the user's authorization for collecting such data. Furthermore, the machine-learned model 616 can use the user feedback data, the escalation data, and/or the retention data as ground truth data. The ground truth data can allow the machine-learned model to recognize communication profiles that were successful and/or that had positive outcomes in relation to the user data (e.g., the user preferences) to output the communication profile. The user data that corresponds to user preferences and communication history data can be provided to a machine-learning model as the training data and the data relating to user feedback and outcomes can be use as the ground truth data. Therefore, during training, the machine-learning model can use user data to determine user preferences, user feedback data that indicates positive and negative outcomes, and determine communication attributes associated with positive outcomes and negative outcomes. After the machine-learned model is trained, it can output a communication attribute and/or a transition threshold value.

In some instances, the machine-learned model 616 can be trained to output a communication attribute. For example, the machine-learned model 616 can be trained to receive the user input communication data and use the user data (e.g., conversation history data, user feedback data, etc.) as the ground truth data to determine communication attribute changes that were successful and/or that had positive outcomes. Then, machine-learned model 616 can, after receiving the user input communication data as input, output a communication attribute that can increase a likelihood of a positive experience for the user.

In some instances, the machine-learned model 616 can be trained to output a transition threshold value. The machine-learned model 616 can be trained to receive the second communication attribute as input and use the user data as ground truth data to determine transition threshold values. The user data can indicate, for a particular communication attribute change, when transitions occurred too quickly or too slowly and the machine-learned model 616 can be trained to output the transition threshold value associated with a second communication attribute.

Figure 7:
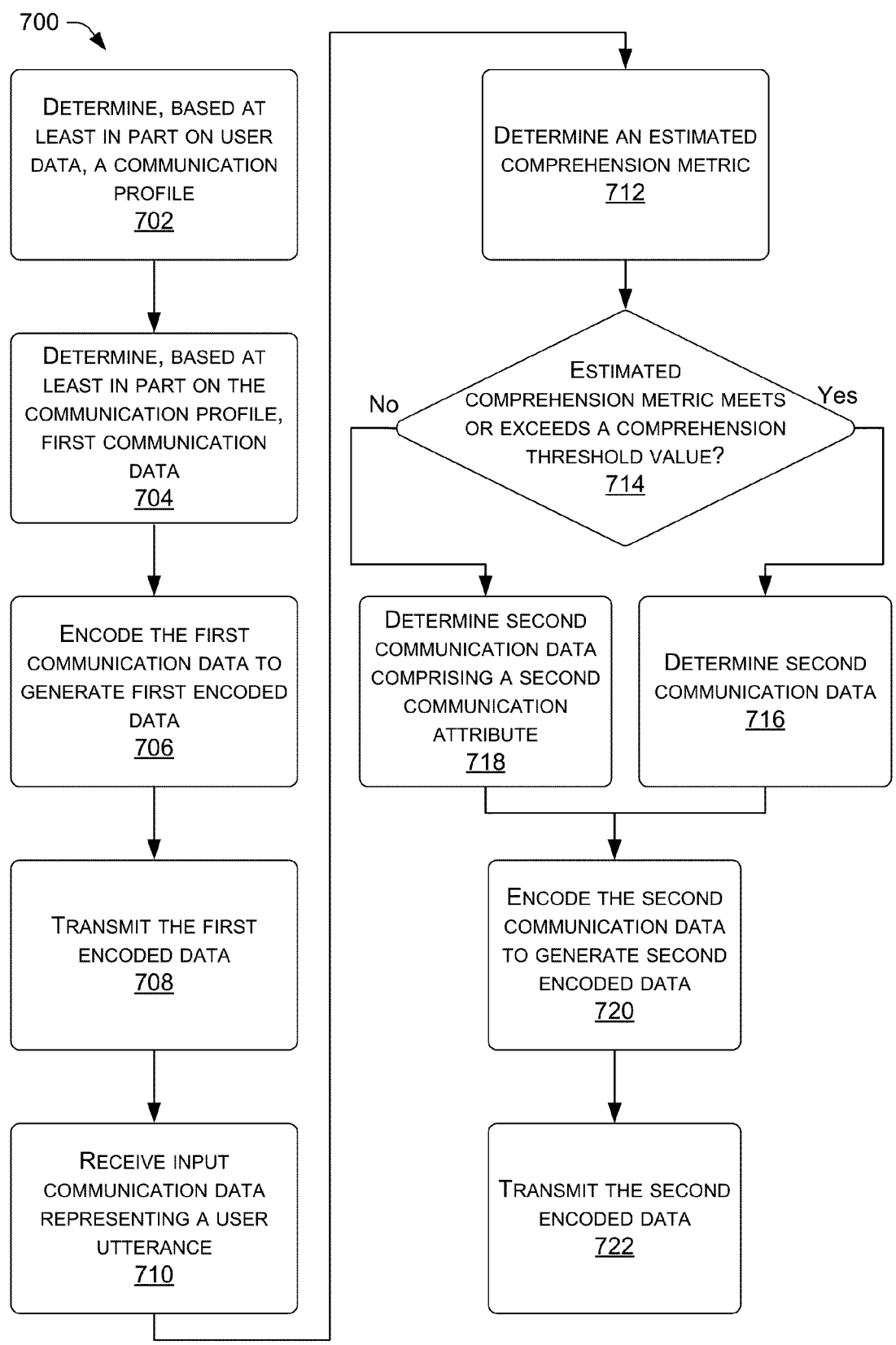
FIG. 7 is a flow diagram of an example process for determining second communication data, encoding the second communication data, and transmitting the second encoded data.

FIG. 7 illustrates an example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. FIG. 7 is a flow diagram of an example process 700 for determining second communication data, encoding the second communication data, and transmitting the second encoded data.

At operation 702, the process 700 can determine, based at least in part on user data, a communication profile. In some instances, a user data component can receive user data associated with a user from a user data database. In some instances, the user can initiate a communication with the virtual assistant system and the user data component can obtain the user data that is associated with the user from the user data database.

A communication profile component can determine a communication profile based at least in part on the user data. For example, the user data can indicate preferences associated with the user (e.g., a preference for fast speaking customer service representatives, a preference for customer service representatives with a louder voice, and the like). The communication profile component can determine, based at least in part on the user data, one or more communication attributes that are stored and/or associated with the communication profile.

At operation 704, the process 700 can determine, based at least in part on the communication profile, first communication data. The first communication data can include first communication text data and first communication attribute data that is associated with the one or more communication attributes.

At operation 706, the process 700 can encode the first communication data to generate first encoded data. In some instances, the first communication data can be encoded using, for example, a markup format (e.g., SSML, XML, and the like) into first encoded data. When received and processed, the first encoded data can produce output text data, audio data, and/or video data.

At operation 708, the process 700 can transmit the first encoded data to a user device associated with the user. At operation 710, the process 700 can receive input communication data representing a user utterance. In some instances, a user input component can use ASR and/or NLU systems to determine content data and context data based on the input communication data. The content data can represent the utterance of the user and the context data can represent portions of the input communication data that is associated with the content data (e.g., background noise).

At operation 712, the process 700 can determine an estimated comprehension metric. A comprehension component can receive the content data and the context data to determine the estimated comprehension metric. For example, the comprehension component can estimate a level of comprehension by the user and quantify the estimated level of comprehension by generating the estimated comprehension metric. As discussed above and by way of example and without limitation, the estimated comprehension metric can be a numerical scale (e.g., 0 indicating that the user will likely not comprehend any communication from the virtual assistant system, and 1 indicating that the user will likely comprehend all communication from the virtual assistant system). The comprehension component can determine the estimated comprehension metric based on the input communication data.

At operation 714, the process 700 can compare the estimated comprehension metric with a comprehension threshold value to determine if the estimated comprehension metric meets or exceeds the comprehension threshold value. If the estimate comprehension metric meets or exceeds the comprehension threshold value, the process 700 can proceed to operation 716. If the estimate comprehension metric does not meet or exceed the comprehension threshold value, the process 700 can proceed to operation 718.

At operation 716, the process 700 can determine second communication data. For example, if the estimated comprehension metric meets or exceeds a comprehension metric threshold value, then a communication data component can continue to communicate with the user using the communication profile and/or the attribute data used with the communication data during the initial communication with the user (e.g., refrain from modifying the communication profile or communication attribute).

At operation 718, the process 700 can determine second communication data comprising a second communication attribute. For example, if the estimated comprehension metric does not meet or exceed the estimated comprehension metric threshold value, the communication data component can determine a second communication attribute to determine the second communication data. By way of example and without limitation, the input communication data can indicate that the signal-to-noise ratio does not meet or exceed the signal-to-noise ratio threshold value and that the amount by which it is less than the signal-to-noise ratio threshold value can cause the estimated comprehension metric to not meet or exceed the estimated comprehension metric threshold value. The communication data component can determine the second communication attribute that increases the volume attribute associated with the second communication data such that when the second communication data is processed, it can produce a louder audio signal when compared to the first communication data.

At operation 720, the process 700 can encode the second communication data to generate second encoded data. Similar to operation 706, the second encoded data can be encoded using, for example, a markup format (e.g., SSML, XML, and the like) into second encoded data. At operation 722, the process 700 can transmit the second encoded data to the user device associated with the user.

By way of example and without limitation, a service associated with a user can call the user. The virtual assistant system can use a user identifier (e.g., the phone number) to retrieve user data from the user database. The user data can indicate that the user prefers virtual assistants that speak slowly. Using the user data, the virtual assistant system can determine a communication profile that includes a speech speed attribute that can control a speed of the audio output by a user device.

Based on the communication profile, the virtual assistant can generate first communication data that includes a greeting text data, a description of the purpose of contacting the user text data, and a speech speed attribute associated with the text data. The virtual assistant can transmit the first communication data to the user device which can output the audio at a speed indicated by the speech speed attribute. Then the virtual assistant system can receive input communication data that represents an utterance of the user.

The virtual assistant system can determine that the user is requesting to speak with a human customer service representative. In response, the virtual assistant system can determine second communication data that includes an indication of a call transfer. Then the virtual assistant system can transmit the second communication data to the user device and transmit the call to a human customer service representative associated with the service.

By way of another example and without limitation, a service associated with a user can call the user. The service can be, for example, a security system company and the purpose of the communication can be regarding, for example, a detected break in at a residence of the user. Based on the purpose of the communication, the virtual assistant system can determine a communication profile that includes an empathy attribute that can control the text generated by the virtual assistant system.

Based on the communication profile, the virtual assistant can generate first communication data that includes a description of the purpose of contacting the user. For example, the text data can state "We apologize for the interruption but we wanted to inform you that we have detected an intrusion at your house." In some instances, text data with a lower level empathy attribute can state "There is an intrusion at your home." Therefore, the empathy attribute can control the text data generated by the virtual assistant system to empathize more with the user.

By way of another example and without limitation, a user can call a customer support phone number of a service using a cell phone. The service can detect the phone number used by the user and provide the phone number to the virtual assistant system. The virtual assistant system can use the phone number as a user identifier to retrieve user data from the user database. The user data can indicate that the user prefers virtual assistants that speak quickly. Using the user data, the virtual assistant system can determine a communication profile that includes a speech speed attribute that can control a speed of the audio output by a user device.

Based on the communication profile, the virtual assistant can generate first communication data that includes a greeting and the speech speed attribute associated with the greeting. The virtual assistant can transmit the first communication data to the user device 120 which can output the audio at a speed indicated by the speech speed attribute. Then the virtual assistant system can receive input communication data that represents an utterance of the user.

The virtual assistant system can determine that the user speaks with a northeastern American accent. Additionally, the virtual assistant system can determine that the estimated satisfaction metric will increase if the virtual assistant system uses a similar accent. In response, the virtual assistant system can determine second communication data that includes the speech accent attribute with a northeastern American accent. Then the virtual assistant system can transmit the second communication data to the user device. As discussed above, the level associated with the speech accent attribute can be increased gradually over time and can be controlled based on a transition threshold value generated by a transition component and/or a machine-learned model.

By way of another example and without limitation, a user can call a customer support phone number of a service using a cell phone. The service can detect the phone number used by the user and provide the phone number to the virtual assistant system. The virtual assistant system can use the phone number as a user identifier to retrieve user data from the user database. The user data can indicate that the user prefers virtual assistants that speak loudly. Using the user data, the virtual assistant system can determine a communication profile that includes a speech volume attribute that can control a volume of the audio output by a user device.

In some instances, the virtual assistant system can be used to assist and/or train human customer service representatives. A human customer service representative can answer the call from the user and the virtual assistant can monitor the conversation between the human customer service representative and the user.

The virtual assistant system can determine that the user had difficulty hearing the human customer service representative and communication data that includes a recommendation for the human customer service representative to speak more loudly. Then the virtual assistant system can transmit the communication data to a device associated with the human customer service representative. For example, the communication data can be transmitted to the device associated with the human customer service representative over a text messaging application and/or platform which can allow the human customer service representative to continue speaking with the user while receiving text data from the virtual assistant system on the device.

Figure 8:
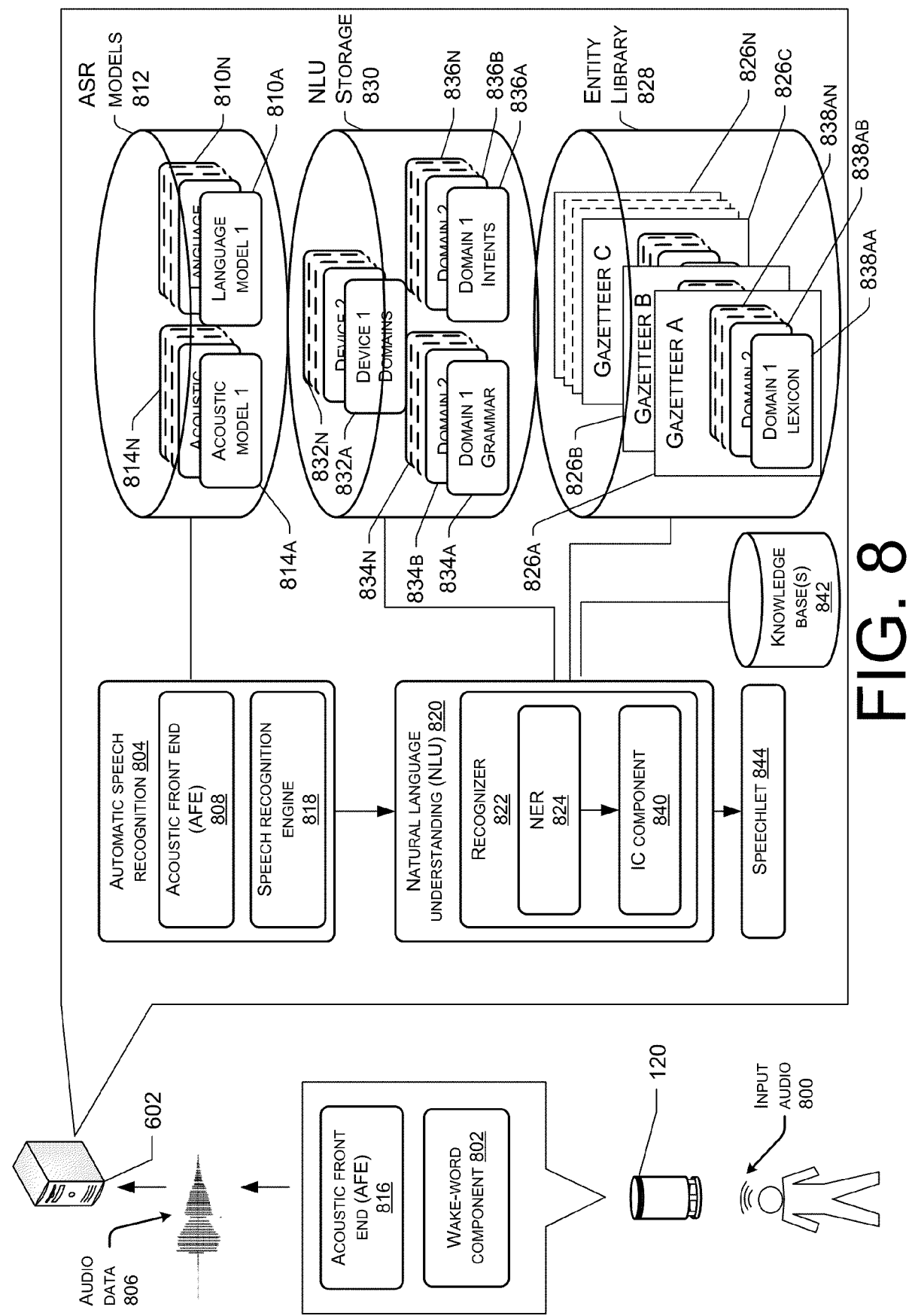
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 602). The various components illustrated may be located on a same or different physical devices. Message between various components illustrated in FIG. 8 may occur directly or across a network. An audio capture component, such as a microphone of the device 120, or another device, captures audio 800 corresponding to a spoken utterance. The device 120, using a wake-word component 802, then processes audio data corresponding to the audio 800 to determine if a keyword (such as a wakeword) is detected in the audio data. Following detection of a wakeword, the device 120 sends audio data 806 corresponding to the utterance to the remote system 602 that can further include an ASR component 804. The audio data 806 may be output from an optional acoustic front end (AFE) 808 located on the device prior to transmission. In other instances, the audio data 806 may be in a different form for processing by a remote AFE 808, such as the AFE 808 located with the ASR component 804 of the remote system 602.

The wake-word component 802 works in conjunction with other components of the user device, for example a microphone to detect keywords in audio 800. For example, the device may convert audio 800 into audio data, and process the audio data with the wake-word component 802 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 802 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 802 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN) / recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 120 may "wake" and begin transmitting audio data 806 corresponding to input audio 800 to the remote system 602 for speech processing. Audio data corresponding to that audio may be sent to remote system 602 for routing to a recipient device or may be sent to the remote system 602 for speech processing for interpretation of the included speech (either for purposes of enabling voice-messages and/or for purposes of executing a command in the speech). The audio data 806 may include data corresponding to the wakeword, or the portion of the audio data corresponding to the wakeword may be removed by the local device 120 prior to sending. Further, a local device may "wake" upon detection of speech/spoken audio above a threshold, as described herein. Upon receipt by the remote system 602, an ASR component 804 may convert the audio data 806 into text. The ASR transcribes audio data into text data representing the words of the speech contained in the audio data 806. The text data may then be used by other components for various purposes, such as executing system commands, inputting data, etc. A spoken utterance in the audio data is input to a processor configured to perform ASR which then interprets the utterance based on the similarity between the utterance and pre-established language models 810 stored in an ASR model knowledge base (ASR Models Storage 812). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 814 stored in an ASR Models Storage 812), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 816 and a speech recognition engine 818. The acoustic front end (AFE) 816 transforms the audio data from the microphone into data for processing by the speech recognition engine 818. The speech recognition engine 818 compares the speech recognition data with acoustic models 814, language models 810, and other data models and information for recognizing the speech conveyed in the audio data. The AFE 808 may reduce noise in the audio data and divide the digitized audio data into frames representing time intervals for which the AFE 808 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 818 may process the output from the AFE 808 with reference to information stored in speech/model storage (812). Alternatively, post front-end processed data (such as feature vectors) may be received by the device executing ASR processing from another source besides the internal AFE. For example, the user device may process audio data into feature vectors (for example using an on-device AFE 808) and transmit that information to a server across a network for ASR processing. Feature vectors may arrive at the remote system 602 encoded, in which case they may be decoded prior to processing by the processor executing the speech recognition engine 818.

The speech recognition engine 818 attempts to match received feature vectors to language phonemes and words as known in the stored acoustic models 814 and language models 810. The speech recognition engine 818 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, call Rob's Home." The wake detection component may identify the wake word, otherwise described as a trigger expression, "Alexa," in the user utterance and may "wake" based on identifying the wake word. Audio data corresponding to the user utterance may be sent to the remote system 602, where the speech recognition engine 818 may identify, determine, and/or generate text data corresponding to the user utterance, here "Rob's home."

The speech recognition engine 818 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 818 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 602, for natural language understanding (NLU) processing, such as conversion of the text into commands for execution, either by the user device, by the remote system 602, or by another device (such as a server running a specific application like a search engine, etc.).

The device performing NLU processing (e.g., system 602) may include various components, including potentially dedicated processor(s), memory, storage, etc. As shown in FIG. 8, an NLU component 820 may include a recognizer 822 that includes a named entity recognition (NER) component 824 which is used to identify portions of query text that correspond to a named entity that may be recognizable by the system. A downstream process called named entity resolution links a text portion to a specific entity known to the system. To perform named entity resolution, the system may utilize gazetteer information (826a-826n) stored in entity library storage 828. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR component 804 based on the utterance input audio 800) and attempts to make a semantic interpretation of the text. That is, the NLU process determines the meaning behind the text based on the individual words and then implements that meaning. NLU component 820 interprets a text string to derive an intent or a desired action from the user as well as the pertinent pieces of information in the text that allow a device (e.g., device 120) to complete that action. For example, if a spoken utterance is processed using ASR component 804 and outputs the text "call Rob's Home" the NLU process may determine that the user intended to establish a communication channel with one or more devices associated with a user account with the identifier of "Rob's Home."

The NLU may process several textual inputs related to the same utterance. For example, if the ASR component 804 outputs N text segments (as part of an N-best list), the NLU may process all N outputs to obtain NLU results.

As will be discussed further below, the NLU process may be configured to parse and tag to annotate text as part of NLU processing. For example, for the text "call Rob's Home," "call" may be tagged as a command (to establish a communication channel) and "Rob's Home" may be tagged as the naming identifier of the user account associated with one or more devices to establish the communication channel with.

To correctly perform NLU processing of speech input, an NLU component 820 may be configured to determine a "domain" of the utterance so as to determine and narrow down which services offered by the endpoint device (e.g., remote system 602 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 824 receives a query in the form of ASR results and attempts to identify relevant grammars and lexical information that may be used to construe meaning. To do so, the NLU component 820 may begin by identifying potential domains that may relate to the received query. The NLU storage 830 includes a database of devices (832a-832n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 822, language model and/or grammar database (834a-834n), a particular set of intents/actions (836a-836n), and a particular personalized lexicon (838). Each gazetteer (884a-884n) may include domain-indexed lexical information associated with a particular user and/or device. For example, the Gazetteer A (826a) includes domain-index lexical information 838aa to 838an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 840 parses the query to determine an intent or intents for each identified domain, where the intent corresponds to the action to be performed that is responsive to the query. Each domain is associated with a database (836a-836n) of words linked to intents. For example, a communications intent database may link words and phrases such as "call," "initiate call," "communicate," to a "call" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 840 identifies potential intents for each identified domain by comparing words in the query to the words and phrases in the intents database 836. In some instances, the determination of an intent by the IC component 840 is performed using a set of rules or templates that are processed against the incoming text to identify a matching intent.

In order to generate a particular interpreted response, the NER component 824 applies the grammar models and lexical information associated with the respective domain to actually recognize a mention of one or more entities in the text of the query. In this manner, the NER component 824 identifies "slots" or values (i.e., particular words in query text) that may be needed for later command processing. Depending on the complexity of the NER component 824, it may also label each slot with a type of varying levels of specificity (such as noun, place, device name, device location, city, artist name, song name, amount of time, timer number, or the like). Each grammar model 834 includes the names of entities (i.e., nouns) commonly found in speech about the particular domain (i.e., generic terms), whereas the lexical information 838 from the gazetteer 826 is personalized to the user(s) and/or the device. For instance, a grammar model associated with the shopping domain may include a database of words commonly used when people discuss shopping.

The intents identified by the IC component 840 are linked to domain-specific grammar frameworks (included in 834) with "slots" or "fields" to be filled with values. Each slot / field corresponds to a portion of the query text that the system believes corresponds to an entity. To make resolution more flexible, these frameworks would ordinarily not be structured as sentences, but rather based on associating slots with grammatical tags. For example, if "call" is an identified intent, a grammar (834) framework or frameworks may correspond to sentence structures such as "call {Rob's Home} user account."

For example, the NER component 824 may parse the query to identify words as subject, object, verb, preposition, etc., based on grammar rules and/or models, prior to recognizing named entities. The identified verb may be used by the IC component 840 to identify intent, which is then used by the NER component 824 to identify frameworks. A framework for the intent of "play a song," meanwhile, may specify a list of slots/fields applicable to play the identified "song" and any object modifier (e.g., specifying a music collection from which the song should be accessed) or the like. The NER component 824 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type / semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 824 may search the database of generic words associated with the domain (in the knowledge base 842). So, for instance, if the query was "call Rob's Home," after failing to determine which user account to initiate a communication channel with, the NER component 824 may search the domain vocabulary for the phrase "Rob's Home". In the alternative, generic words may be checked before the gazetteer information, or both may be tried, potentially producing two different results.

The output data from the NLU processing (which may include tagged text, commands, etc.) may then be sent to a speechlet 844. The destination speechlet 844 may be determined based on the NLU output. For example, if the NLU output includes a command to send a message, the destination speechlet 844 may be a message sending application, such as one located on the user device or in a message sending appliance, configured to execute a message sending command. If the NLU output includes a search request, the destination speechlet 844 may include a search engine processor, such as one located on a search server, configured to execute a search command. After the appropriate command is generated based on the intent of the user, the speechlet 844 may provide some or all of this information to a text-to-speech (TTS) engine. The TTS engine may then generate an actual audio file for outputting the audio data determined by the speechlet 844 (e.g., "okay," or "connecting to Rob's Home"). After generating the file (or "audio data"), the TTS engine may provide this data back to the remote system 602.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 820 during runtime operations where NLU operations are performed on text (such as text output from an ASR component 804). Each domain may have specially configured components to perform various steps of the NLU operations.

For example, in an NLU system, the system may include a multi-domain architecture consisting of multiple domains for intents / commands executable by the system (or by other devices connected to the system), such as music, video, books, and information. The system may include a plurality of domain recognizers, where each domain may include its own recognizer 822. Each recognizer may include various NLU components such as an NER component 824, IC component 840 and other components such as an entity resolver, or other components.

For example, a messaging domain recognizer 822-A (Domain A) may have an NER component 824-A that identifies what slots (i.e., portions of input text) may correspond to particular words relevant to that domain. The words may correspond to entities such as (for the messaging domain) a recipient. An NER component 824 may use a machine learning model, such as a domain specific conditional random field (CRF) to both identify the portions corresponding to an entity as well as identify what type of entity corresponds to the text portion. The messaging domain recognizer 822-A may also have its own intent classification (IC) component 840-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 602 may include a model training component. The model training component may be used to train the classifier(s) / machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 602, as illustrated herein are exemplary, and may be located in a stand-alone device or may be included, in whole or in part, as a component of a larger device or system, may be distributed across a network or multiple devices connected by a network, etc.

Figure 9:
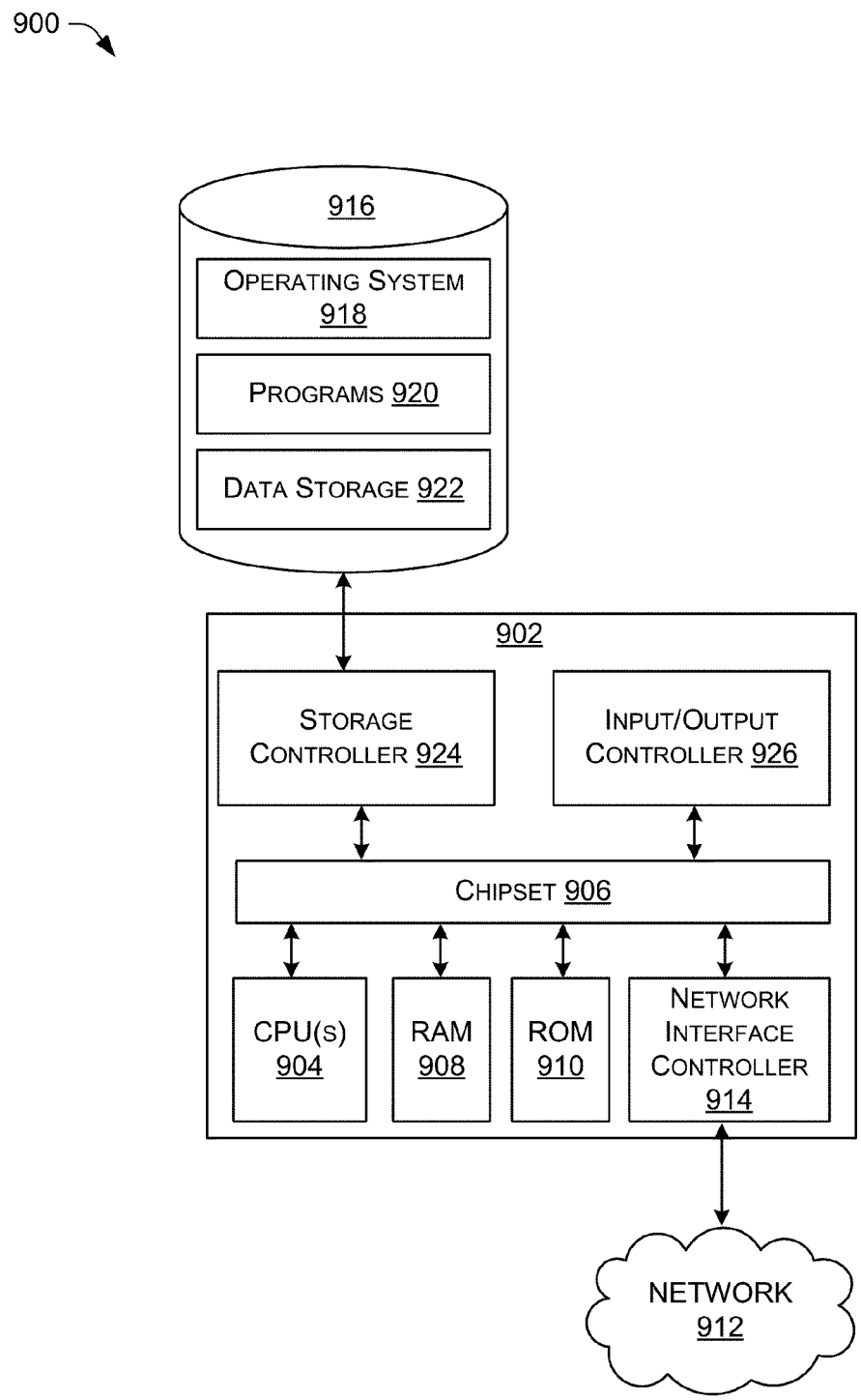
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 912. The chipset 906 can include functionality for providing network connectivity through a NIC 914, such as a gigabit Ethernet adapter. The NIC 914 is capable of connecting the computer 900 to other computing devices over the network 912. It should be appreciated that multiple NICs 914 can be present in the computer 900, connecting the computer to other types of networks and remote computer systems.

The computer 900 can be connected to a mass storage device 916 that provides non-volatile storage for the computer. The mass storage device 916 can store an operating system 918, programs 920, and data, which have been described in greater detail herein. The mass storage device 916 can be connected to the computer 900 through a storage controller 922 connected to the chipset 906. The mass storage device 916 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 916 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 916 is characterized as primary or secondary storage, and the like.

For example, the computer 900 can store information to the mass storage device 916 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 916 by detecting the physical states or characteristics of one or more particular locations within the physical storage units.

In addition to the mass storage device 916 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the virtual assistant system 602, and or any components included therein, may be supported by one or more devices similar to computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 916 can store an operating system 918 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 916 can store other system or application programs and data utilized by the computer 900.

In one embodiment, the mass storage device 916 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1—8. The computer 900 can also include computer-readable storage media having instructions stored thereupon for performing any of the other computer-implemented operations described herein.

The computer 900 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer readable media storing computer executable instructions that, when executed, cause the system to perform operations comprising:
determining user data indicating a plurality of preferences of a user;
determining, based on the user data, a communication profile that includes a plurality of communication attributes associated with a virtual customer representative;
determining, based on the communication profile, first communication data representing a first communication to the user, the first communication data comprising first communication text data of the first communication and a first communication attribute of the plurality of communication attributes that indicates an audio feature associated with the first communication text data, the first communication attribute associated with one of:
a volume,
a speed, or
an inflection;
encoding, based on a text to speech protocol, the first communication data to generate first encoded data;
transmitting, to a user device, the first encoded data, wherein the first encoded data causes the user device to output audio data associated with the first communication based on the first communication attribute;
receiving, from the user device, input audio data representing a user utterance responsive to the audio data associated with the first communication output by the user device;
determining, based on the input audio data representing the user utterance responsive to the audio data associated with the first communication output by the user device, an estimated comprehension metric that is associated with the user, the estimated comprehension metric indicating an estimated user comprehension level of the first communication in association with the audio data output by the user device, wherein the estimated comprehension metric is represented based on a scale having a first value that indicates that the user is likely to comprehend the first communication and a second value that indicates that the user is not likely to comprehend the first communication;
determining, based on the estimated comprehension metric, second communication data representing a response to the input audio data to be audibly output via the user device, the second communication data comprising second communication text data of the response and a second communication attribute of the plurality of communication attributes that is different from the first communication attribute;
encoding, based on the text to speech protocol, the second communication data to generate second encoded data; and
transmitting, to the user device, the second encoded data.

2. The system as recited in claim 1, wherein the first communication attribute is associated with a first volume, the operations further comprising:
determining, based on context data associated with the input audio data, a signal to noise ratio associated with the input audio data,
wherein determining the estimated comprehension metric is further based on determining that the signal to noise ratio is less than a signal to noise threshold value, and
wherein the second communication attribute comprises a second volume that meets or exceeds the first volume, the first volume indicating a first amplitude of a first audio signal associated with the first communication data and the second volume indicating a second amplitude of a second audio signal associated with the second communication data, the second amplitude greater than the first amplitude.

3. The system as recited in claim 1, wherein the first communication attribute is associated with a first speed, the operations further comprising:
determining that the estimated comprehension metric is less than a comprehension metric threshold value,
wherein determining the second communication data is in response to determining that the estimated comprehension metric is less than the comprehension metric threshold value, and
wherein the second communication attribute comprises a second speed that is less than the first speed, the first speed indicating a first frequency of a first audio signal associated with the first communication data and the second speed indicating a second frequency of a second audio signal associated with the second communication data, the second speed greater than the first speed.

4. The system as recited in claim 1, wherein the first encoded data is transmitted at a first time and the second encoded data is transmitted at a second time that is subsequent to the first time, the operations further comprising:
determining a time period between the first time and the second time;
determining, based on the second communication attribute, a transition threshold value that indicates a minimum amount of time between transmitting the first encoded data and transmitting the second encoded data; and
determining that the time period meets or exceeds the transition threshold value.

5. The system as recited in claim 1, the operations further comprising:
determining, based on the input audio data, an estimated satisfaction metric that is associated with the user and that indicates an estimated level of satisfaction of the user with respect to the first communication; and
determining the second communication data based on the estimated satisfaction metric.

6. The system as recited in claim 1, the operations further comprising:
determining that the user provided feedback relating to at least one of the first encoded data or the second encoded data; and
decreasing, based on the feedback, the estimated comprehension metric.

7. The system as recited in claim 1, the operations further comprising parsing the input audio data to detect one or more predetermined words included within the user utterance, wherein determining the estimated comprehension metric is based on detecting the one or more predetermined words.

8. A method comprising:
determining user data associated with a user;
determining a preferred user action associated with the user, the preferred user action indicating a desired outcome of a communication with the user;
determining, based at least in part on the user data and the preferred user action, a communication profile that stores a set of communication attributes associated with a virtual assistant;

determining, based at least in part on the communication profile, first communication data comprising first communication text data and a first communication attribute of the set of communication attributes, the first communication data associated with an initial communication between the virtual assistant and the user;

encoding the first communication data to generate first encoded data;

transmitting, to a user device associated with the user, the first encoded data, wherein the first encoded data causes the user device to output audio data associated with the first communication text data based at least in part on the first communication attribute;

receiving, from the user device, input communication data representing a user utterance responsive to the audio data associated with the first communication text data output by the user device;

determining, based at least in part on the input communication data representing the user utterance responsive to the audio data associated with the first communication text data output by the user device, an estimated comprehension metric associated with one of a speech processing system or the user, wherein the estimated comprehension metric indicates whether the virtual assistant and the user are likely to comprehend each other;

determining, based at least in part on the input communication data and the estimated comprehension metric, second communication data representing a response to the input communication data to be audibly output via the user device and comprising second communication text data and a second communication attribute of the set of communication attributes, wherein the second communication attribute is different from the first communication attribute;

encoding the second communication data to generate second encoded data; and transmitting, to the user device, the second encoded data.

9. The method as recited in claim 8, wherein the first communication attribute indicates a feature associated with the output of the audio data by the user device, the first communication attribute indicating at least one of:
a volume,
a speed,
a pitch,
an inflection,
an accent,
a dialect,
a diction,
a gender, or
an age.

10. The method of claim 8, wherein the user data comprises historical communication log data of the user and the virtual assistant, the method further comprising:
inputting the user data into a machine learned model, wherein determining the communication profile comprises:
receiving, from the machine learned model, the communication profile.

11. The method of claim 10, further comprising:
training the machine learned model using ground truth data as training data, the ground truth data comprising at least one of:
previous communication data associated with a set of users,
user feedback data associated with the set of users,
user activity data associated with the set of users, or
escalation data that indicates a request to change a customer service representative.

12. The method of claim 10, wherein the first encoded data is transmitted at a first time and the second encoded data is transmitted at a second time that is subsequent to the first time, further comprising:
inputting the input communication data into the machine learned model, wherein determining the second communication attribute comprises:
receiving, from the machine learned model, the second communication attribute;
determining a time period between the first time and the second time;
receiving, from the machine learned model, a transition threshold value; and
determining that the time period meets or exceeds the transition threshold value.

13. The method of claim 8, wherein the communication profile is a first communication profile, the set of communication attributes is a first set of communication attributes, the method further comprising:
determining a second communication profile that stores a second set of communication attributes, wherein determining the second communication data is further based at least in part on the second communication profile, wherein the first set of communication attributes defines an identity of the virtual assistant and wherein an individual communication attribute of the second set of communication attributes is excluded from the first set of communication attributes to refrain from modifying the identity.

14. A non transitory computer readable medium storing instructions executable by a processor, wherein the instructions, when executed, cause the processor to perform operations comprising:
encoding first communication data to generate first encoded data, the first communication data comprising first communication text data and a first communication attribute of a set of communication attributes associated with a virtual assistant;
transmitting, to a user device associated with a user, the first encoded data, wherein the first encoded data causes the user device to output audio data associated with the first communication text data based at least in part on the first communication attribute;
receiving, from the user device, input communication data representing a user utterance responsive to the audio data associated with the first communication text data output by the user device;
determining, based at least in part on the input communication data representing the user utterance responsive to the audio data associated with the first communication text data output by the user device, an estimated comprehension metric associated with one of a speech processing system or the user, wherein the estimated comprehension metric indicates whether the virtual assistant and the user are likely to comprehend each other;
determining, based at least in part on the input communication data and the estimated comprehension metric, second communication data representing a response to the input communication data to be audibly output via the user device and comprising second communication text data and a second communication attribute of the set of communication attributes, wherein the second communication attribute is different from the first communication attribute;

encoding the second communication data to generate second encoded data; and transmitting, to the user device, the second encoded data.

15. The non transitory computer readable medium of claim 14, the operations further comprising:

determining user data comprising historical log data of the user;

inputting the user data into a machine learned model; and receiving, from the machine learned model, a communication profile that stores the set of communication attributes.

16. The non transitory computer readable medium of claim 15, the operations further comprising:

training the machine learned model using ground truth data as training data, the ground truth data comprising at least one of:

previous communication data associated with a set of users, user feedback data associated with the set of users, or escalation data that indicates a request to change a customer service representative.

17. The non transitory computer readable medium of claim 15, the operations further comprising:

inputting the input communication data into the machine learned model, wherein determining the second communication attribute comprises:

receiving, from the machine learned model, the second communication attribute.

18. The non transitory computer readable medium of claim 17, wherein the first encoded data is transmitted at a first time and the second encoded data is transmitted at a second time that is subsequent to the first time, the operations further comprising:

determining a time period between the first time and the second time;

receiving, from the machine learned model, a transition threshold value; and determining that the time period meets or exceeds the transition threshold value.

19. The non transitory computer readable medium of claim 14, wherein the set of communication attributes is a first set of communication attributes, the operations further comprising:

determining a second set of communication attributes, wherein determining the second communication data is further based at least in part on the second set of communication attributes.

20. The non transitory computer readable medium of claim 14, wherein the input communication data is first input communication data, the operations further comprising:

receiving, from the user device, second input communication data;

determining, based at least in part on the second input communication data, third communication data comprising third communication text and a third communication attribute of the set of communication attributes;

encoding the third communication data to generate third encoded data; and transmitting, to the user device, the third encoded data.

* * * * *